(12) United States Patent
Kamada et al.

(10) Patent No.: US 11,008,065 B2
(45) Date of Patent: May 18, 2021

(54) BICYCLE SPROCKET ARRANGEMENT

(71) Applicant: SHIMANO INC., Sakai (JP)

(72) Inventors: Kenji Kamada, Sakai (JP); Azusa Yamazaki, Sakai (JP)

(73) Assignee: SHIMANO INC., Sakai (JP)

( * ) Notice: Subject to any disclaimer, the term of this patent is extended or adjusted under 35 U.S.C. 154(b) by 333 days.

(21) Appl. No.: 16/182,608

(22) Filed: Nov. 7, 2018

(65) Prior Publication Data

US 2020/0140033 A1 May 7, 2020

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC .......... B62M 9/10; B62M 9/12; B62M 9/105; B62M 9/121
USPC ........................................................ 474/160
See application file for complete search history.

(56) References Cited

U.S. PATENT DOCUMENTS

| | | | | |
|---|---|---|---|---|
| 6,045,472 A * | 4/2000 | Sung | ........................ | B62M 9/10 474/158 |
| 6,264,575 B1 * | 7/2001 | Lim | ........................ | B62M 9/10 192/64 |
| 6,340,338 B1 * | 1/2002 | Kamada | ................... | B62M 9/10 474/152 |
| 6,923,741 B2 * | 8/2005 | Wei | ........................... | B62M 9/10 474/152 |
| 7,011,592 B2 * | 3/2006 | Shahana | .................. | B62M 9/10 474/152 |
| 7,931,553 B2 * | 4/2011 | Tokuyama | ............... | B62M 9/10 474/160 |
| 7,959,529 B2 * | 6/2011 | Braedt | ..................... | B62M 9/10 474/160 |
| 8,057,338 B2 * | 11/2011 | Kamada | ................... | B62M 9/10 474/160 |
| 8,100,795 B2 * | 1/2012 | Reiter | ..................... | B62M 9/10 474/160 |
| 8,177,670 B2 * | 5/2012 | Kamada | ................... | B62M 9/10 474/160 |
| 8,197,371 B2 * | 6/2012 | D'Aluisio | ................ | B62M 9/12 474/160 |
| 8,550,944 B2 * | 10/2013 | Esquibel | ............... | B62M 9/105 474/160 |

(Continued)

FOREIGN PATENT DOCUMENTS

| | | |
|---|---|---|
| CN | 107031787 | 8/2017 |
| CN | 108068972 | 5/2018 |

*Primary Examiner* — Henry Y Liu
(74) *Attorney, Agent, or Firm* — Mori & Ward, LLP

(57) ABSTRACT

A bicycle sprocket arrangement comprises a largest sprocket, a smallest sprocket, and a plurality of intermediate sprockets. A first quotient is obtained if a total tooth-space number of the large sprocket is divided by a half of the tooth-space number difference. The first quotient is an even number with respect to all sprockets of the plurality of intermediate sprockets. A second quotient is obtained if the total tooth-space number of the small sprocket is divided by a half of the tooth-space number difference. The second quotient is an even number with respect to all sprockets of the plurality of intermediate sprockets excluding a largest intermediate sprocket of the plurality of intermediate sprockets.

24 Claims, 17 Drawing Sheets

(56) References Cited

U.S. PATENT DOCUMENTS

| | | | |
|---|---|---|---|
| 8,696,503 B2* | 4/2014 | Oishi | B62M 9/125 |
| | | | 474/160 |
| 8,905,878 B2* | 12/2014 | Loy | B62M 9/10 |
| | | | 474/160 |
| 8,956,254 B2* | 2/2015 | Tokuyama | B62M 9/12 |
| | | | 474/160 |
| 9,011,282 B2* | 4/2015 | Staples | B62M 9/12 |
| | | | 474/160 |
| 9,297,450 B2* | 3/2016 | Numata | F16H 55/0873 |
| 9,334,014 B2* | 5/2016 | Fukunaga | B62M 9/12 |
| 9,376,165 B2* | 6/2016 | Oishi | B62M 9/10 |
| 9,463,844 B2* | 10/2016 | Fukunaga | B62M 9/10 |
| 9,926,038 B2* | 3/2018 | Fukunaga | B62M 9/10 |
| 2016/0167737 A1 | 6/2016 | Tokuyama et al. | |
| 2018/0127057 A1 | 5/2018 | Sugimoto | |
| 2018/0299004 A1 | 10/2018 | Ohno et al. | |

* cited by examiner

| SPROCKET | TOTAL TOOTH-SPACE NUMBER | TND | QT1 | QT2 |
|---|---|---|---|---|
| SS | 12 | TND1=2 | QT11=14 | QT21=12 |
| S1 | 14 | TND2=2 | QT12=16 | QT22=14 |
| S2 | 16 | TND3=4 | QT13=10 | QT23= 8 |
| S3 | 20 | TND4=4 | QT14=12 | QT24=10 |
| S4 | 24 | TND5=6 | QT15=10 | QT25= 8 |
| S5 | 30 | TND6=6 | QT16=12 | QT26=10 |
| S6 | 36 | TND7=6 | QT17=14 | QT27=12 |
| S7 | 42 | | | |
| SL | 49 | | | |

FIG. 14

BICYCLE SPROCKET ARRANGEMENT

BACKGROUND OF THE INVENTION

Field of the Invention

The present invention relates to a bicycle sprocket arrangement.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket arrangement comprises a largest sprocket, a smallest sprocket, and a plurality of intermediate sprockets disposed between the largest sprocket and the smallest sprocket in an axial direction with respect to a rotational center axis of the bicycle sprocket arrangement. The largest sprocket has a largest total tooth-space number that is an odd number. The largest sprocket includes an upshifting initiation tooth and an additional upshifting initiation tooth which are spaced apart from each other without another upshifting initiation tooth therebetween in a circumferential direction with respect to a rotational center axis of the bicycle sprocket arrangement. An even number of tooth-spaces is disposed between the upshifting initiation tooth and the additional upshifting initiation tooth in the circumferential direction. The smallest sprocket has a smallest total tooth-space number that is an even number. A tooth-space number difference is defined as a difference between a total tooth-space number of a large sprocket among the plurality of intermediate sprockets and a total tooth-space number of a small sprocket among the plurality of intermediate sprockets and the smallest sprocket. The large sprocket and the small sprocket are adjacent to each other without another sprocket therebetween in the axial direction. A first quotient is obtained if the total tooth-space number of the large sprocket is divided by a half of the tooth-space number difference. The first quotient is an even number with respect to all sprockets of the plurality of intermediate sprockets. A second quotient is obtained if the total tooth-space number of the small sprocket is divided by a half of the tooth-space number difference. The second quotient is an even number with respect to all sprockets of the plurality of intermediate sprockets excluding a largest intermediate sprocket of the plurality of intermediate sprockets.

With the bicycle sprocket arrangement according to the first aspect, regardless of a chain phase of the bicycle chain engaged with the largest sprocket, the largest sprocket can change a chain phase of the bicycle chain engaged with a neighboring smaller sprocket of the largest sprocket to a predetermined chain phase of the bicycle chain after an upshifting operation in which the bicycle chain is shifted from the largest sprocket to the neighboring smaller sprocket. This can reduce influence of a chain phase of the bicycle chain engaged with the neighboring smaller sprocket to a shifting operation in the bicycle sprocket arrangement. Especially, it is possible to reduce undesirable shock resulting from the shifting operation.

In accordance with a second aspect of the present invention, the bicycle sprocket arrangement according to the first aspect is configured so that the upshifting initiation tooth of the largest sprocket is configured to initially disengage from a bicycle chain in an upshifting operation in which the bicycle chain is shifted from the largest sprocket to a neighboring smaller sprocket of the plurality of intermediate sprockets. The additional upshifting initiation tooth of the largest sprocket is configured to initially disengage from the bicycle chain in another upshifting operation in which the bicycle chain is shifted from the largest sprocket to the neighboring smaller sprocket of the plurality of intermediate sprockets.

With the bicycle sprocket arrangement according to the second aspect, the largest sprocket can effectively change the chain phase of the bicycle chain engaged with the neighboring smaller sprocket to the predetermined chain phase of the bicycle chain after the upshifting operation. This can reduce influence of a chain phase of the bicycle chain engaged with the neighboring smaller sprocket to a shifting operation in the bicycle sprocket arrangement. Especially, it is possible to reduce undesirable shock resulting from the shifting operation.

In accordance with a third aspect of the present invention, the bicycle sprocket arrangement according to the first or second aspect is configured so that the largest sprocket includes at least one downshifting initiation tooth configured to initially receive a bicycle chain engaged with a neighboring smaller sprocket of the plurality of intermediate sprockets in a downshifting operation in which the bicycle chain is shifted from the neighboring smaller sprocket of the plurality of intermediate sprockets to the largest sprocket.

With the bicycle sprocket arrangement according to the third aspect, it is possible to reduce shock in the downshifting operation in which the bicycle chain is shifted from the neighboring smaller sprocket to the largest sprocket.

In accordance with a fourth aspect of the present invention, the bicycle sprocket arrangement according to any one of the first to third aspects is configured so that at least one sprocket of the plurality of intermediate sprockets includes an upshifting initiation tooth and an additional upshifting initiation tooth which are spaced apart from each other without another upshifting initiation tooth therebetween in the circumferential direction.

With the bicycle sprocket arrangement according to the fourth aspect, it is possible to reduce shock in an upshifting operation in which the bicycle chain is shifted from one sprocket of the plurality of intermediate sprockets to a neighboring smaller sprocket of the plurality of intermediate sprockets.

In accordance with a fifth aspect of the present invention, the bicycle sprocket arrangement according to any one of the first to fourth aspects is configured so that an odd number of tooth-spaces is disposed between the upshifting initiation tooth of the at least one sprocket of the plurality of intermediate sprockets and the additional upshifting initiation tooth of the at least one sprocket of the plurality of intermediate sprockets in the circumferential direction.

With the bicycle sprocket arrangement according to the fifth aspect, it is possible to effectively reduce shock in the upshifting operation in which the bicycle chain is shifted from one sprocket of the plurality of intermediate sprockets to a neighboring smaller sprocket of the plurality of intermediate sprockets.

In accordance with a sixth aspect of the present invention, the bicycle sprocket arrangement according to any one of the first to fifth aspects is configured so that the largest total tooth-space number is equal to or larger than 34.

With the bicycle sprocket arrangement according to the sixth aspect, it is possible to make pedaling comfortable at the start of pedaling or during pedaling on a slope.

In accordance with a seventh aspect of the present invention, the bicycle sprocket arrangement according to any one of the first to sixth aspects is configured so that the plurality of intermediate sprockets includes a chain-phase adjusting sprocket. The chain-phase adjusting sprocket is configured to change a chain phase of a bicycle chain to another chain phase in a shifting operation in which the bicycle chain is shifted from the chain-phase adjusting sprocket to a neighboring smaller sprocket.

With the bicycle sprocket arrangement according to the seventh aspect, the chain-phase adjusting sprocket can change a chain phase of the bicycle chain engaged with a neighboring smaller sprocket of the chain-phase adjusting sprocket to a predetermined chain phase of the bicycle chain after an upshifting operation in which the bicycle chain is shifted from the chain-phase adjusting sprocket to the neighboring smaller sprocket of the chain-phase adjusting sprocket.

In accordance with an eighth aspect of the present invention, the bicycle sprocket arrangement according to the seventh aspect is configured so that the chain-phase adjusting sprocket is adjacent to the smallest sprocket without another sprocket therebetween in the axial direction.

With the bicycle sprocket arrangement according to the eighth aspect, the chain-phase adjusting sprocket can change a chain phase of the bicycle chain engaged with the smallest sprocket to the predetermined chain phase of the bicycle chain after an upshifting operation.

In accordance with a ninth aspect of the present invention, the bicycle sprocket arrangement according to the seventh aspect is configured so that the chain-phase adjusting sprocket includes an upshifting initiation tooth and an additional upshifting initiation tooth which are spaced apart from each other without another upshifting initiation tooth therebetween in the circumferential direction. An even number of tooth-spaces is disposed between the upshifting initiation tooth of the chain-phase adjusting sprocket and the additional upshifting initiation of the tooth chain-phase adjusting sprocket.

With the bicycle sprocket arrangement according to the ninth aspect, the chain-phase adjusting sprocket can effectively change the chain phase of the bicycle chain engaged with the neighboring smaller sprocket of the chain-phase adjusting sprocket to the predetermined chain phase of the bicycle chain after the upshifting operation.

In accordance with a tenth aspect of the present invention, the bicycle sprocket arrangement according to the seventh aspect is configured so that a total tooth-space number of the chain-phase adjusting sprocket is equal to or smaller than 18.

With the bicycle sprocket arrangement according to the tenth aspect, on a top-gear side in the bicycle sprocket arrangement, the chain-phase adjusting sprocket can change the chain phase of the bicycle chain engaged with the neighboring smaller sprocket of the chain-phase adjusting sprocket to the predetermined chain phase of the bicycle chain after the upshifting operation.

In accordance with an eleventh aspect of the present invention, the bicycle sprocket arrangement according to the seventh aspect is configured so that a total tooth-space number of the chain-phase adjusting sprocket is equal to or larger than 12.

With the bicycle sprocket arrangement according to the eleventh aspect, on a top-gear side in the bicycle sprocket arrangement, the chain-phase adjusting sprocket can change the chain phase of the bicycle chain engaged with the neighboring smaller sprocket of the chain-phase adjusting sprocket to the predetermined chain phase of the bicycle chain after the upshifting operation.

In accordance with a twelfth aspect of the present invention, the bicycle sprocket arrangement according to any one of the first to eleventh aspects is configured so that at least one sprocket of the plurality of intermediate sprockets includes at least one upshifting initiation tooth and at least one downshifting initiation tooth.

With the bicycle sprocket arrangement according to the twelfth aspect, it is possible to reduce shock in an upshifting operation and a downshifting operation at a sprocket other than the largest and smallest sprockets.

In accordance with a thirteenth aspect of the present invention, the bicycle sprocket arrangement according to any one of the first to twelfth aspects is configured so that the plurality of intermediate sprockets includes a first intermediate sprocket having a total tooth-space number which is 14, a second intermediate sprocket having a total tooth-space number which is 16, a third intermediate sprocket having a total tooth-space number which is 20, a fourth intermediate sprocket having a total tooth-space number which is 24, a fifth intermediate sprocket having a total tooth-space number which is 30, a sixth intermediate sprocket having a total tooth-space number which is 36, and a seventh intermediate sprocket having a total tooth-space number which is 42.

With the bicycle sprocket arrangement according to the thirteenth aspect, it is possible to reduce shock in a shifting operation between sprockets of the plurality of intermediate sprockets.

In accordance with a fourteenth aspect of the present invention, the bicycle sprocket arrangement according to the thirteenth aspect is configured so that the largest total tooth-space number is 49. The smallest total tooth-space number is 12.

With the bicycle sprocket arrangement according to the fourteenth aspect, it is possible to realize a wide gear range of the bicycle sprocket arrangement.

In accordance with a fifteenth aspect of the present invention, a bicycle sprocket arrangement comprises a largest sprocket, a smallest sprocket, and a plurality of intermediate sprockets. The largest sprocket has a largest total tooth-space number. The smallest sprocket has a smallest total tooth-space number that is an even number. Each of the plurality of intermediate sprockets has a total tooth-space number that is an even number. The plurality of intermediate sprockets is disposed between the largest sprocket and the smallest sprocket in an axial direction with respect to a rotational center axis of the bicycle sprocket arrangement and including a chain-phase adjusting sprocket that includes an upshifting initiation tooth and an additional upshifting initiation tooth which are spaced apart from each other without another upshifting initiation tooth therebetween in a circumferential direction with respect to the rotational center axis of the bicycle sprocket arrangement. An even number of tooth-spaces is disposed between the upshifting initiation tooth of the chain-phase adjusting sprocket and the additional upshifting initiation tooth of the chain-phase adjusting sprocket in the circumferential direction. The fifteenth aspect can be combined with any one of the first to fourteenth aspects.

With the bicycle sprocket arrangement according to the fifteenth aspect, the chain-phase adjusting sprocket can change a chain phase of the bicycle chain engaged with a neighboring smaller sprocket of the chain-phase adjusting sprocket to a predetermined chain phase of the bicycle chain after an upshifting operation in which the bicycle chain is shifted from the chain-phase adjusting sprocket to the neighboring smaller sprocket of the chain-phase adjusting sprocket.

In accordance with a sixteenth aspect of the present invention, the bicycle sprocket arrangement according to the fifteenth aspect is configured so that the chain-phase adjusting sprocket is adjacent to the smallest sprocket without another sprocket therebetween in an axial direction with respect to the rotational center axis.

With the bicycle sprocket arrangement according to the sixteenth aspect, on a top-gear side in the bicycle sprocket arrangement, the chain-phase adjusting sprocket can change a chain phase of the bicycle chain engaged with the smallest sprocket to the predetermined chain phase of the bicycle chain after an upshifting operation.

In accordance with a seventeenth aspect of the present invention, the bicycle sprocket arrangement according to the fifteenth or sixteenth aspect is configured so that a total tooth-space number of the chain-phase adjusting sprocket is equal to or smaller than 18.

With the bicycle sprocket arrangement according to the seventeenth aspect, on a top-gear side in the bicycle sprocket arrangement, the chain-phase adjusting sprocket can change the chain phase of the bicycle chain engaged with the neighboring smaller sprocket of the chain-phase adjusting sprocket to the predetermined chain phase of the bicycle chain after the upshifting operation.

In accordance with an eighteenth aspect of the present invention, the bicycle sprocket arrangement according to any one of the fifteenth to seventh aspects is configured so that a total tooth-space number of the chain-phase adjusting sprocket is equal to or larger than 12.

With the bicycle sprocket arrangement according to the eighteenth aspect, on a top-gear side in the bicycle sprocket arrangement, the chain-phase adjusting sprocket can change the chain phase of the bicycle chain engaged with the neighboring smaller sprocket of the chain-phase adjusting sprocket to the predetermined chain phase of the bicycle chain after the upshifting operation.

In accordance with a nineteenth aspect of the present invention, the bicycle sprocket arrangement according to any one of the fifteenth to eighteenth aspects is configured so that the largest total tooth-space number is an odd number.

With the bicycle sprocket arrangement according to the nineteenth aspect, the largest sprocket can change a chain phase of the bicycle chain engaged with a neighboring smaller sprocket of the largest sprocket to a predetermined chain phase of the bicycle chain after an upshifting operation in which the bicycle chain is shifted from the largest sprocket to the neighboring smaller sprocket.

In accordance with a twentieth aspect of the present invention, the bicycle sprocket arrangement according to any one of the fifteenth to nineteenth aspects is configured so that the plurality of intermediate sprockets has a tooth-space number difference defined as a difference between a total tooth-space number of a large sprocket among the plurality of intermediate sprockets and a total tooth-space number of a small sprocket among the plurality of intermediate sprockets and the smallest sprocket. The large sprocket and the small sprocket are adjacent to each other without another sprocket therebetween in an axial direction with respect to the rotational center axis. The tooth-space number difference is two with respect to at least two sprockets of the plurality of intermediate sprockets.

With the bicycle sprocket arrangement according to the twentieth aspect, it is possible to arrange the chain-phase adjusting sprocket in any position of the plurality of intermediate sprockets.

In accordance with a twenty-first aspect of the present invention, the bicycle sprocket arrangement according to any one of the fifteenth to twentieth aspects is configured so that at least one sprocket of the plurality of intermediate sprockets includes an upshifting initiation tooth and an additional upshifting initiation tooth. An odd number of tooth-spaces is disposed between the upshifting initiation tooth of the at least one sprocket of the plurality of intermediate sprockets and the additional upshifting initiation tooth of the at least one sprocket of the plurality of intermediate sprockets in the circumferential direction.

With the bicycle sprocket arrangement according to the twenty-first aspect, it is possible to effectively reduce shock in the upshifting operation in which the bicycle chain is shifted from one sprocket of the plurality of intermediate sprockets to a neighboring smaller sprocket of the plurality of intermediate sprockets.

In accordance with a twenty-second aspect of the present invention, the bicycle sprocket arrangement according to any one of the fifteenth to nineteenth aspects is configured so that a tooth-space number difference is defined as a difference between a total tooth-space number of a large sprocket among the plurality of intermediate sprockets and a total tooth-space number of a small sprocket among the plurality of intermediate sprockets and the smallest sprocket. The large sprocket and the small sprocket are adjacent to each other without another sprocket therebetween in an axial direction with respect to the rotational center axis. A first quotient is obtained if the total tooth-space number of the large sprocket is divided by a half of the tooth-space number difference. The first quotient is an even number with respect to all sprockets of the plurality of intermediate sprockets. A second quotient is obtained if the total tooth-space number of the small sprocket is divided by a half of the tooth-space number difference. The second quotient is an even number with respect to all sprockets of the plurality of intermediate sprockets excluding a largest intermediate sprocket of the plurality of intermediate sprockets.

With the bicycle sprocket arrangement according to the twenty-second aspect, it is possible to effectively reduce shock in the upshifting operation in which the bicycle chain is shifted from one sprocket of the plurality of intermediate sprockets to a neighboring smaller sprocket of the plurality of intermediate sprockets and in the downshifting operation in which the bicycle chain is shifted from one sprocket of the plurality of intermediate sprockets to a neighboring larger sprocket of the plurality of intermediate sprockets.

In accordance with a twenty-third aspect of the present invention, the bicycle sprocket arrangement according to any one of the fifteenth to twenty-second aspects is configured so that the plurality of intermediate sprockets includes a first intermediate sprocket having a total tooth-space number which is 14, a second intermediate sprocket having a total tooth-space number which is 16, a third intermediate sprocket having a total tooth-space number which is 20, a fourth intermediate sprocket having a total tooth-space number which is 24, a fifth intermediate sprocket having a total tooth-space number which is 30, a sixth intermediate sprocket having a total tooth-space number which is 36, and a seventh intermediate sprocket having a total tooth-space number which is 42.

With the bicycle sprocket arrangement according to the twenty-third aspect, effectively reduce shock in the upshifting operation in which the bicycle chain is shifted from one sprocket of the plurality of intermediate sprockets to a neighboring smaller sprocket of the plurality of intermediate sprockets and in the downshifting operation in which the bicycle chain is shifted from one sprocket of the plurality of intermediate sprockets to a neighboring larger sprocket of the plurality of intermediate sprockets.

In accordance with a twenty-fourth aspect of the present invention, the bicycle sprocket arrangement according to the twenty-third aspect is configured so that the largest total tooth-space number is one of 48 and 49. The smallest total tooth-space number is 12.

With the bicycle sprocket arrangement according to the twenty-fourth aspect, it is possible to realize a wide gear range of the bicycle sprocket arrangement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 14 is a table showing a total tooth-space number of each sprocket, a tooth-space number difference between adjacent two sprockets, a first quotient of each tooth-space number difference, and a second quotient of each tooth-space number difference in the bicycle sprocket arrangement illustrated in FIG. 1.

DESCRIPTION OF THE EMBODIMENTS

Figure 1:
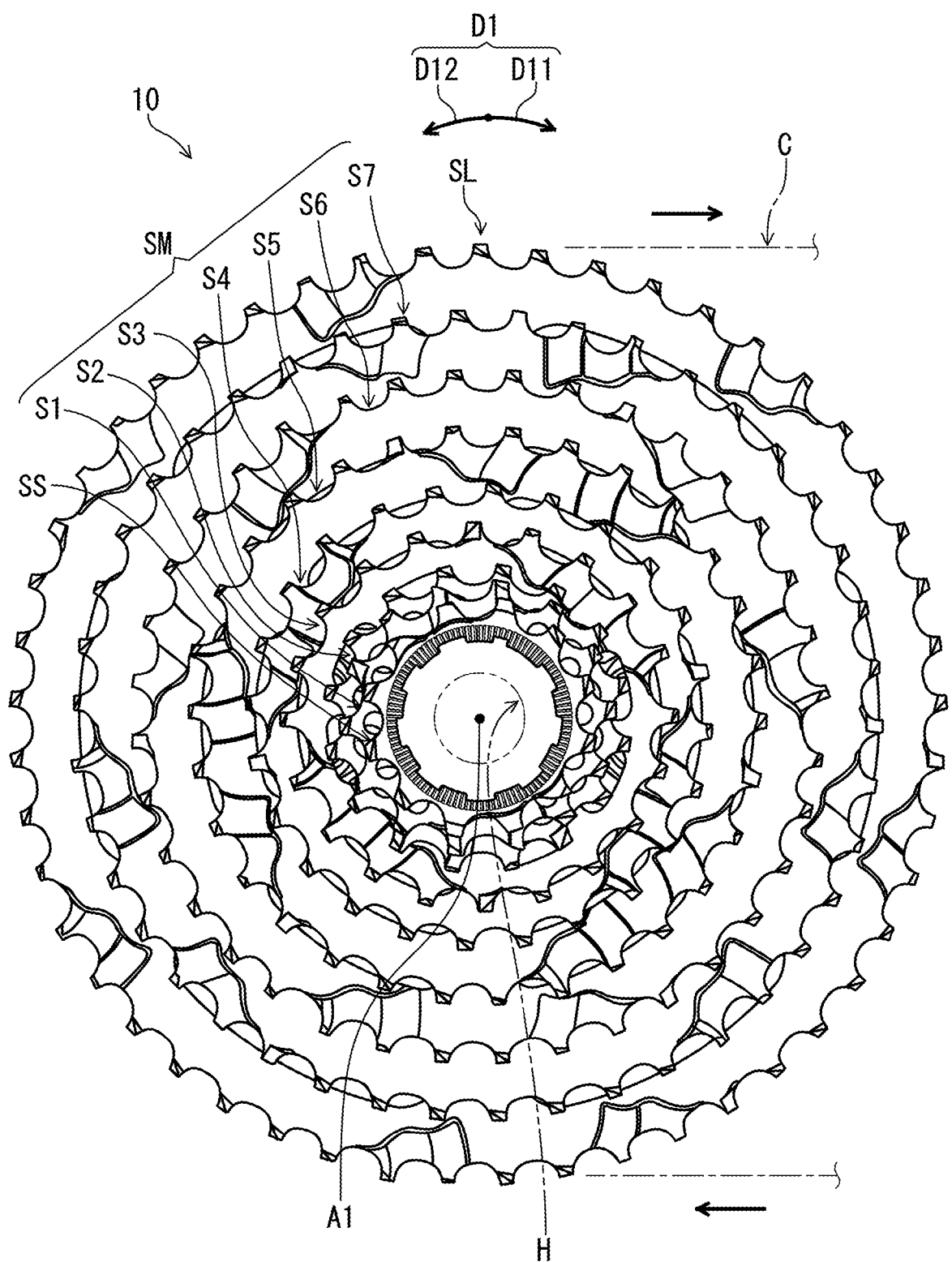
FIG. 1 is a side elevational view of a bicycle sprocket arrangement in accordance with an embodiment.

The embodiment(s) will now be described with reference to the accompanying drawings, wherein like reference numerals designate corresponding or identical elements throughout the various drawings.

Referring initially to FIG. 1, a bicycle sprocket arrangement 10 has a rotational center axis A1. The bicycle sprocket arrangement 10 is rotatably supported by a bicycle hub assembly H relative to a bicycle frame about the rotational center axis A1. The bicycle sprocket arrangement 10 is configured to be engaged with a bicycle chain C to transmit a driving rotational force μl between the bicycle chain C and the bicycle sprocket arrangement 10 during pedaling. The bicycle sprocket arrangement 10 is rotated about the rotational center axis A1 in a driving rotational direction D11 during pedaling. The driving rotational direction D11 is defined along a circumferential direction D1 with respect to the rotational center axis A1 of the bicycle sprocket arrangement 10. A reverse rotational direction D12 is an opposite direction of the driving rotational direction D11 and is defined along the circumferential direction D1.

As seen in FIG. 1, the bicycle sprocket arrangement 10 comprises a largest sprocket SL, a smallest sprocket SS, and a plurality of intermediate sprockets SM disposed between the largest sprocket SL and the smallest sprocket SS in an axial direction D2 with respect to a rotational center axis A1 of the bicycle sprocket arrangement. The plurality of intermediate sprockets SM includes a first intermediate sprocket S1, a second intermediate sprocket S2, a third intermediate sprocket S3, a fourth intermediate sprocket S4, a fifth intermediate sprocket S5, a sixth intermediate sprocket S6, and a seventh intermediate sprocket S7. A total number of sprockets of the bicycle sprocket arrangement 10 is nine. However, the total number of sprockets of the bicycle sprocket arrangement 10 is not limited to this embodiment. The bicycle sprocket arrangement 10 has a plurality of gear positions corresponding to the largest sprocket, the plurality of intermediate sprockets, and the smallest sprocket. For example, the largest sprocket corresponds to low gear, and the smallest sprocket corresponds to top gear. The bicycle chain C is shifted among the plurality of gear positions by a derailleur.

Figure 2:
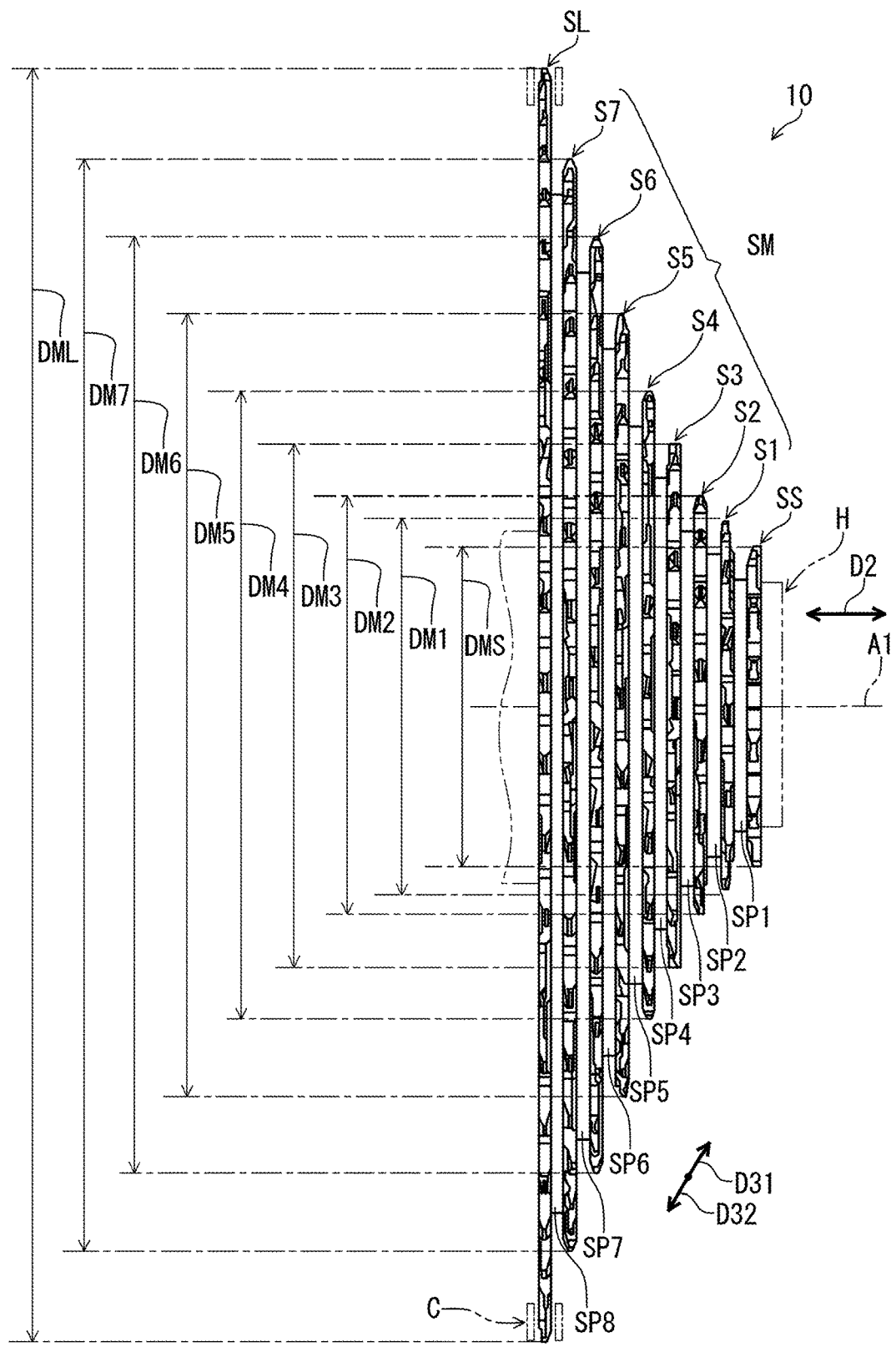
FIG. 2 is a rear view of the bicycle sprocket arrangement illustrated in FIG. 1.

As seen in FIG. 2, the plurality of intermediate sprockets SM is provided between the largest sprocket SL and the smallest sprocket SS in an axial direction D2 with respect to the rotational center axis A1. The smallest sprocket SS, the first to seventh intermediate sprockets S1 to S7, and the largest sprocket SL are arranged in the axial direction D2 in this order. The bicycle sprocket arrangement 10 comprises a plurality of spacers SP1 to SP8. The spacer SP1 is provided between the smallest sprocket SS and the first intermediate sprocket S1 in the axial direction D2. The spacer SP2 is provided between the first intermediate sprocket S1 and the second intermediate sprocket S2 in the axial direction D2.

The spacer SP3 is provided between the second intermediate sprocket S2 and the third intermediate sprocket S3 in the axial direction D2. The spacer SP4 is provided between the third intermediate sprocket S3 and the fourth intermediate sprocket S4 in the axial direction D2. The spacer SP5 is provided between the fourth intermediate sprocket S4 and the fifth intermediate sprocket S5 in the axial direction D2. The spacer SP6 is provided between the fifth intermediate sprocket S5 and the sixth intermediate sprocket S6 in the axial direction D2. The spacer SP7 is provided between the sixth intermediate sprocket S6 and the seventh intermediate sprocket S7 in the axial direction D2. The spacer SP8 is provided between the seventh intermediate sprocket S7 and the largest sprocket SL in the axial direction D2.

In this embodiment, the spacers SP1 to SP8 are separate members from the smallest sprocket SS, the first to seventh intermediate sprockets S1 to S7, and the largest sprocket SL. However, at least of the spacers SP1 to SP8 can be integrally provided with corresponding one of the smallest sprocket SS, the first to seventh sprockets S1 to S7, and the largest sprocket SL as a one-piece unitary member. Furthermore, at least one of the smallest sprocket SS, the first to seventh sprockets S1 to S7, and the largest sprocket SL can be integrally provided with another of the smallest sprocket SS, the first to seventh sprockets S1 to S7, and the largest sprocket SL as a one-piece unitary member. The bicycle sprocket arrangement 10 can be a one-piece unitary member.

For example, upshifting occurs the bicycle chain is shifted from a sprocket to a neighboring smaller sprocket in an upshifting direction D31. Downshifting occurs the bicycle chain is shifted from a sprocket to a neighboring larger sprocket in a downshifting direction D32.

The largest sprocket SL has a largest outer diameter DML having the rotational center axis A1 as a center. The smallest sprocket SS has a smallest outer diameter DMS having the rotational center axis A1 as a center. The first intermediate sprocket S1 has a first outer diameter DM1 having the rotational center axis A1 as a center. The second intermediate sprocket S2 has a second outer diameter DM2 having the rotational center axis A1 as a center. The third intermediate sprocket S3 has a third outer diameter DM3 having the rotational center axis A1 as a center. The fourth intermediate sprocket S4 has a fourth outer diameter DM4 having the rotational center axis A1 as a center. The fifth intermediate sprocket S5 has a fifth outer diameter DM5 having the rotational center axis A1 as a center. The sixth intermediate sprocket S6 has a sixth outer diameter DM6 having the rotational center axis A1 as a center. The seventh intermediate sprocket S7 has a seventh outer diameter DM7 having the rotational center axis A1 as a center. The largest outer diameter DML is the largest among the outer diameters DML, DM1 to DM7, and DMS. The smallest outer diameter DMS is the largest among the outer diameters DML, DM1 to DM7, and DMS.

Figure 3:
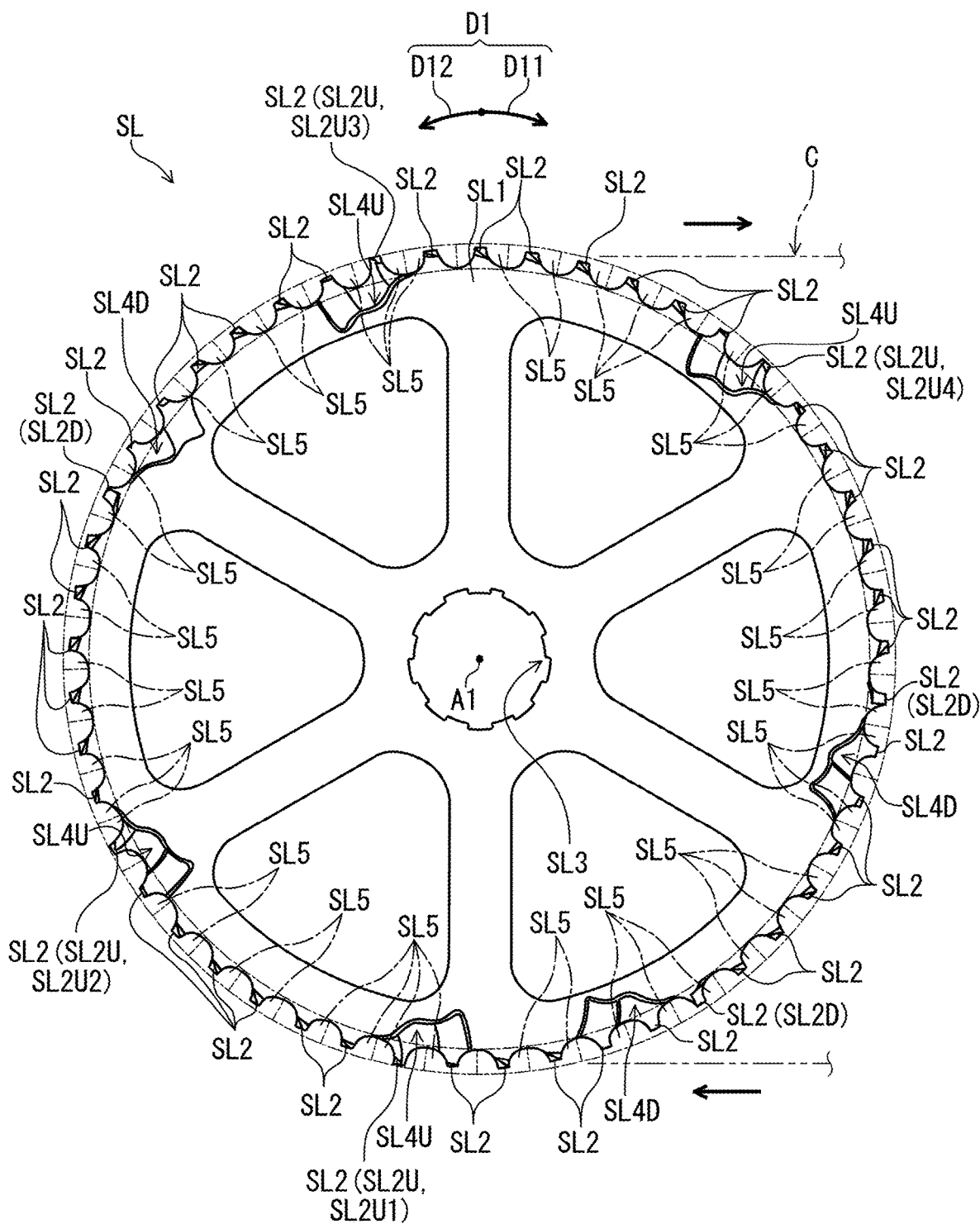
FIG. 3 is a side elevational view of a sprocket of the bicycle sprocket arrangement illustrated in FIG. 1.

As seen in FIG. 3, the largest sprocket SL includes a sprocket body SL1 and a plurality of sprocket teeth SL2. The sprocket body SL1 includes a hub engagement part SL3 configured to be engaged with the bicycle hub assembly H. The plurality of sprocket teeth SL2 extends radially outwardly from the sprocket body SL1 with respect to the rotational center axis A1. The largest outer diameter DML (FIG. 2) is defined by at least one tooth of the plurality of sprocket teeth SL2 with respect to the rotational center axis A1.

The largest sprocket SL has a largest total tooth-space number. The largest total tooth-space number corresponds to a total number of the plurality of sprocket teeth SL2 of the largest sprocket SL in this embodiment. In this embodiment, the largest total tooth-space number is an odd number. The largest total tooth-space number can be equal to or larger than 34. The largest total tooth-space number can be one of 48 and 49. The largest total tooth-space number is 49 in this embodiment. However, the largest total tooth-space number is not limited to this embodiment and the above ranges. The largest total tooth-space number can be an even number such as 48. The term "tooth-space number", as used herein, is intended to be a total number of a tooth-space in which a single sprocket tooth is or can be disposed. The tooth-space is typically provided to an outer periphery of a single sprocket. The single sprocket includes a plurality of tooth-spaces arranged circumferentially at an equal pitch. A total tooth-space number of a sprocket is equal to a total tooth number of the sprocket if sprocket teeth of the sprocket are respectively disposed in tooth-spaces of the sprocket. In contrast, the total tooth-space number of the sprocket can be different from (e.g., larger than) the total tooth number of the sprocket if one or several of sprocket teeth are omitted from the sprocket.

For example, the largest sprocket SL includes a plurality of tooth-spaces SL5. The plurality of tooth-spaces SL5 is provided radially outwardly of the sprocket body SL1 and arranged at an equal pitch in the circumferential direction D1. The sprocket teeth SL2 are respectively disposed in the tooth-spaces SL5.

Figure 4:
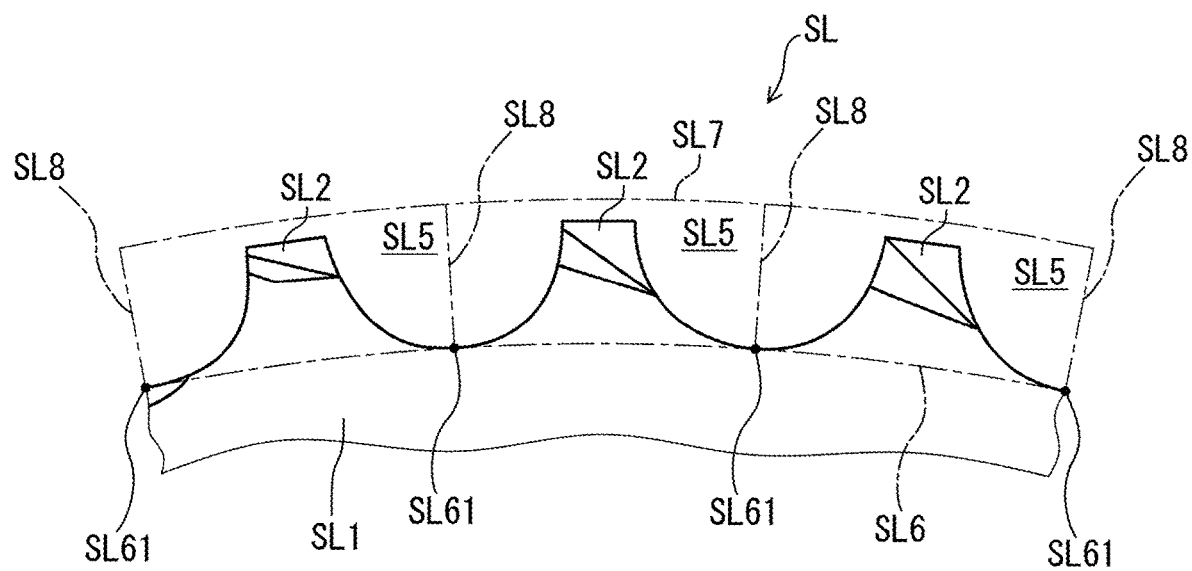
FIG. 4 is a partial side elevational view of the sprocket illustrated in FIG. 3.
Figure 5:
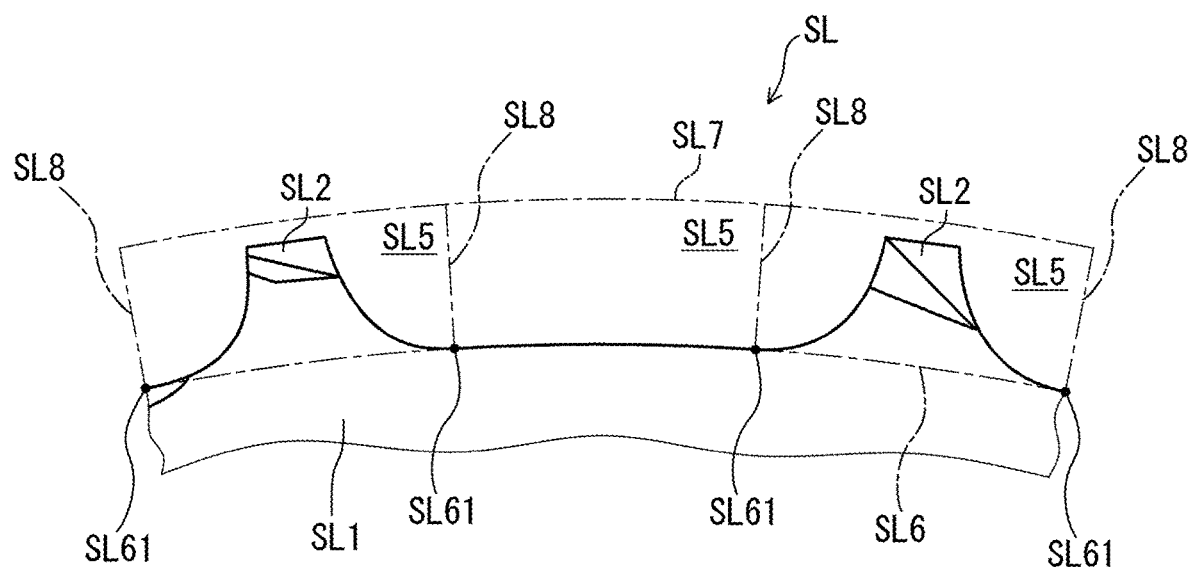
FIG. 5 is a partial side elevational view of a sprocket in accordance with a modification of the sprocket illustrated in FIG. 3.

As seen in FIG. 4, the tooth-space SL5 is defined by a root circle SL6, an outer diameter circle SL7, and adjacent two radial lines SL8 as viewed along the rotational center axis A1 (FIG. 3). The root circle SL6 is defined by a plurality of tooth bottoms SL61. The outer diameter circle SL7 has the largest outer diameter DML. The radial line SL8 extends radially outwardly from the rotational center axis A1 through the tooth bottom SL61. Each of the plurality of tooth-space SL5 has the same shape. As seen in FIG. 5, at least one of the sprocket teeth SL2 can be omitted from the largest sprocket SL. In such embodiments, the largest total tooth-space number is constant while the total number of the plurality of sprocket teeth SL2 decreases.

Figure 6:
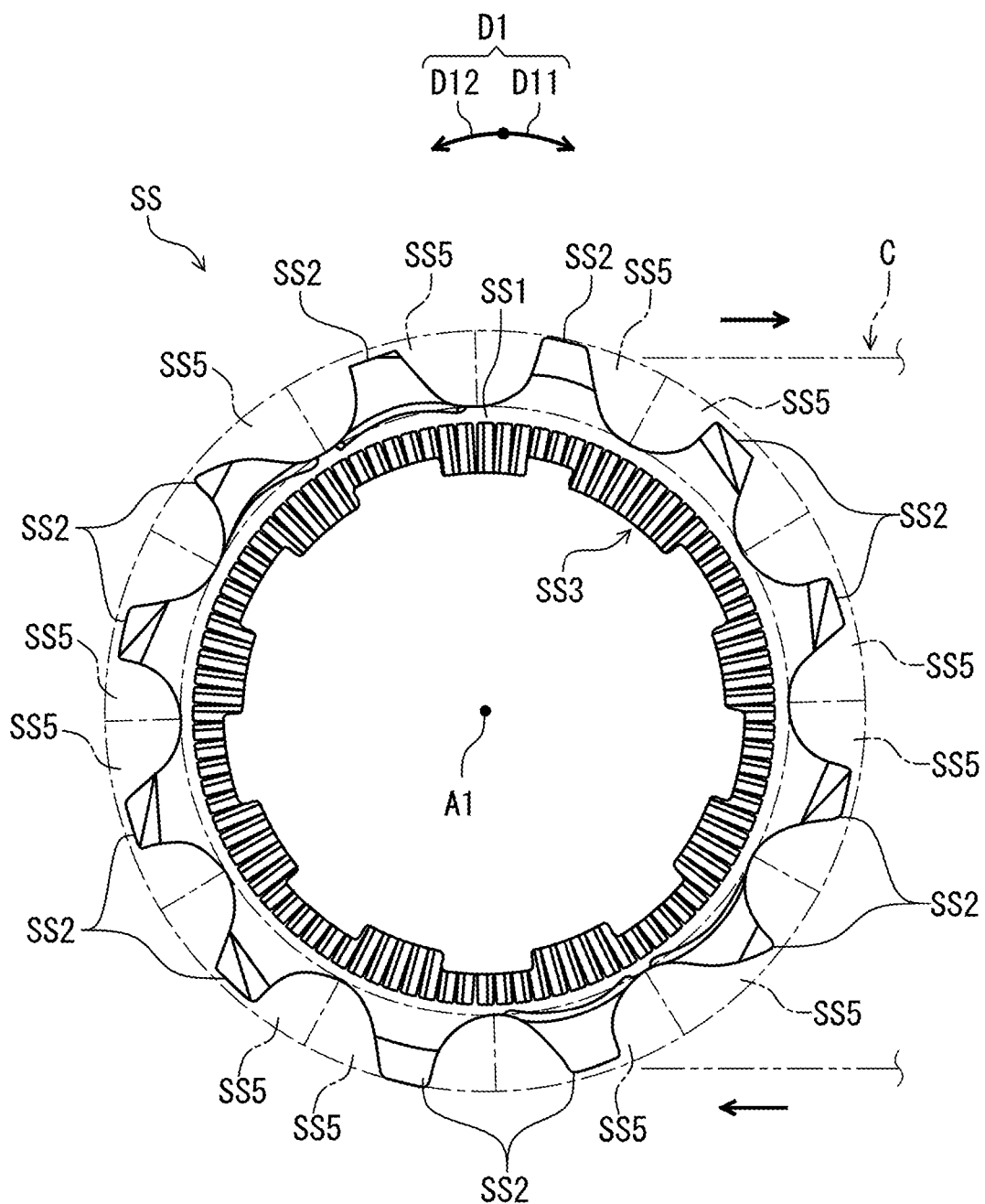
FIG. 6 is a side elevational view of another sprocket of the bicycle sprocket arrangement illustrated in FIG. 1.

As seen in FIG. 6, the smallest sprocket SS includes a sprocket body SS1 and a plurality of sprocket teeth SS2. The sprocket body SS1 includes a hub engagement part SS3 configured to be engaged with the bicycle hub assembly H. The plurality of sprocket teeth SS2 extends radially outwardly from the sprocket body SS1 with respect to the rotational center axis A1. The smallest outer diameter DMS (FIG. 2) is defined by at least one tooth of the plurality of sprocket teeth SS2 with respect to the rotational center axis A1.

The smallest sprocket SS has a smallest total tooth-space number. The smallest total tooth-space number corresponds to a total number of the plurality of sprocket teeth SS2 of the smallest sprocket SS in this embodiment. The smallest total tooth-space number is an even number. In this embodiment, the smallest total tooth-space number is 12. However, the smallest total tooth-space number is not limited to this embodiment and the above ranges.

The smallest sprocket SS includes a plurality of tooth-spaces SS5. The plurality of tooth-spaces SS5 is provided radially outwardly of the sprocket body SS1 and arranged at an equal pitch in the circumferential direction D1. The sprocket teeth SS2 are respectively disposed in the tooth-spaces SS5. The tooth-space SS5 is defined by a root circle, an outer diameter circle, and adjacent two radial lines as viewed along the rotational center axis A1. The tooth-space SS5 has substantially the same structure as that of the tooth-space SL5. Thus, the tooth-space SS5 will not be described in detail here for the sake of brevity.

Figure 7:
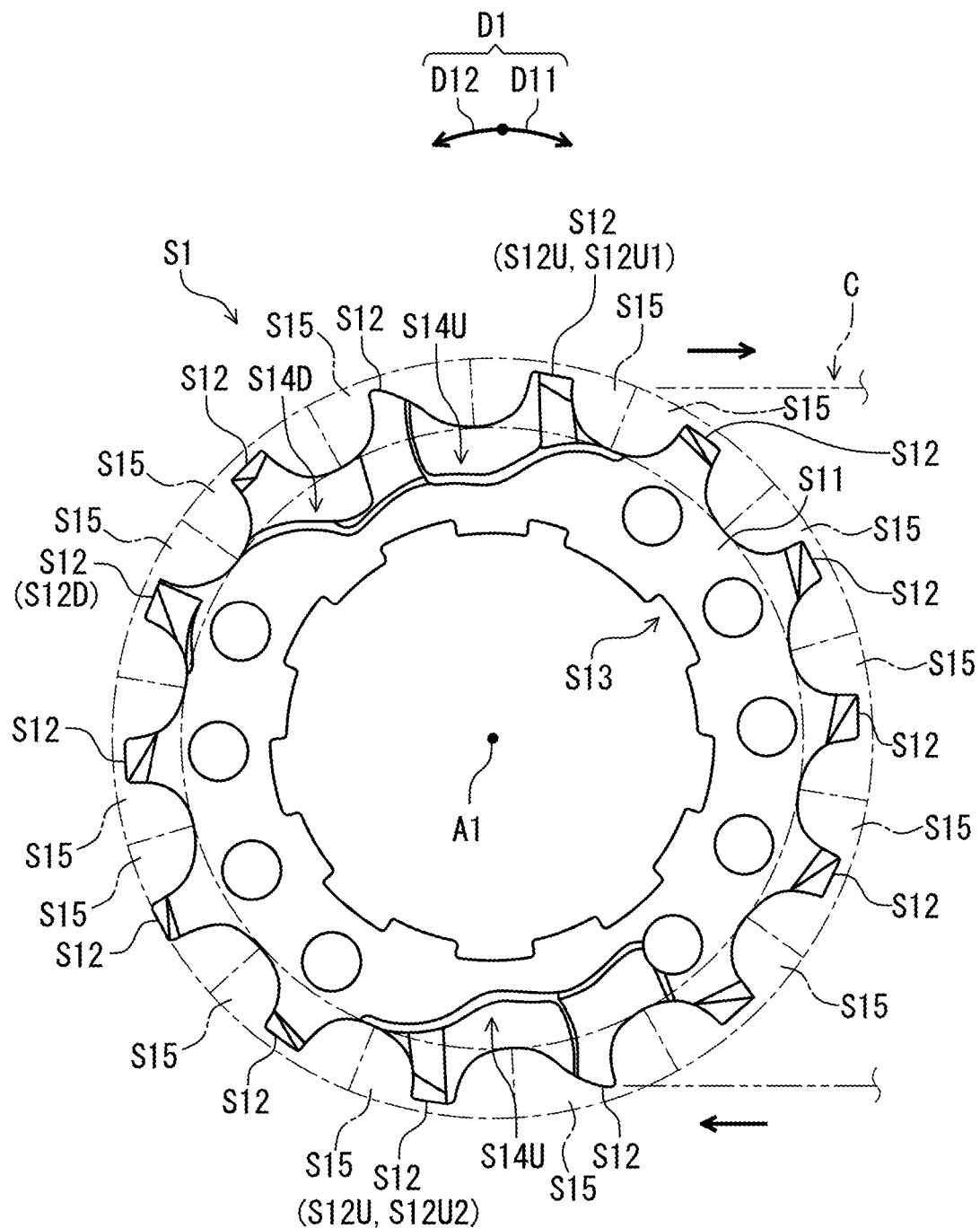
FIG. 7 is a side elevational view of another sprocket of the bicycle sprocket arrangement illustrated in FIG. 1.

As seen in FIG. 7, the first intermediate sprocket S1 includes a sprocket body S11 and a plurality of sprocket teeth S12. The sprocket body S11 includes a hub engagement part S13 configured to be engaged with the bicycle hub assembly H. The plurality of sprocket teeth S12 extends radially outwardly from the sprocket body S11 with respect to the rotational center axis A1. The first outer diameter DM1 (FIG. 2) is defined by at least one tooth of the plurality of sprocket teeth S12 with respect to the rotational center axis A1.

The first intermediate sprocket S has a first total tooth-space number. The first total tooth-space number corresponds to a total number of the plurality of sprocket teeth S12 of the first intermediate sprocket S1 in this embodiment. The plurality of intermediate sprockets SM each of which has a total tooth-space number that is an even number. In this embodiment, the first intermediate sprocket S1 has a total tooth-space number which is 14. However, the first total tooth-space number is not limited to this embodiment. The first total tooth-space number can be an odd number.

The first intermediate sprocket S includes a plurality of tooth-spaces S15. The plurality of tooth-spaces S15 is provided radially outwardly of the sprocket body S11 and arranged at an equal pitch in the circumferential direction D1. The sprocket teeth S12 are respectively disposed in the tooth-spaces S15. The tooth-space S15 is defined by a root circle, an outer diameter circle, and adjacent two radial lines as viewed along the rotational center axis A1. The tooth-space S15 has substantially the same structure as that of the tooth-space SL5. Thus, the tooth-space S15 will not be described in detail here for the sake of brevity.

Figure 8:
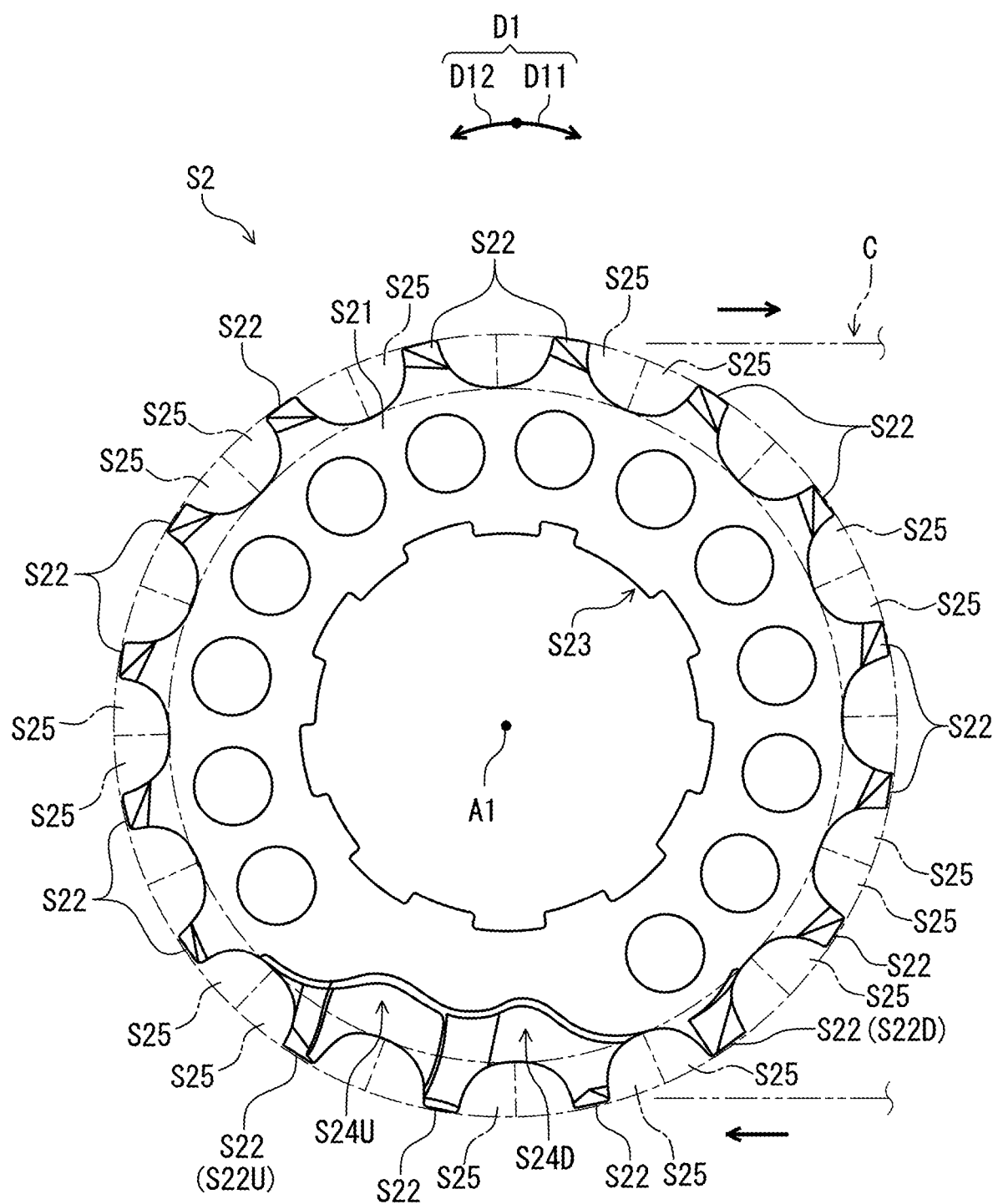
FIG. 8 is a side elevational view of another sprocket of the bicycle sprocket arrangement illustrated in FIG. 1.

As seen in FIG. 8, the second intermediate sprocket S2 includes a sprocket body S21 and a plurality of sprocket teeth S22. The sprocket body S21 includes a hub engagement part S23 configured to be engaged with the bicycle hub assembly H. The plurality of sprocket teeth S22 extends radially outwardly from the sprocket body S21 with respect to the rotational center axis A1. The second outer diameter DM2 (FIG. 2) is defined by at least one tooth of the plurality of sprocket teeth S22 with respect to the rotational center axis A1.

The second intermediate sprocket S2 has a second total tooth-space number. The second total tooth-space number corresponds to a total number of the plurality of sprocket teeth S22 of the second intermediate sprocket in this embodiment. The plurality of intermediate sprockets SM each of which has a total tooth-space number that is an even number. In this embodiment, the second intermediate sprocket S2 has a total tooth-space number which is 16. However, the second total tooth-space number is not limited to this embodiment. The second total tooth-space number can be an odd number.

The second intermediate sprocket S2 includes a plurality of tooth-spaces S25. The plurality of tooth-spaces S25 is provided radially outwardly of the sprocket body S21 and arranged at an equal pitch in the circumferential direction D1. The sprocket teeth S22 are respectively disposed in the tooth-spaces S25. The tooth-space S25 is defined by a root circle, an outer diameter circle, and adjacent two radial lines as viewed along the rotational center axis A1. The tooth-space S25 has substantially the same structure as that of the tooth-space SL5. Thus, the tooth-space S25 will not be described in detail here for the sake of brevity.

Figure 9:
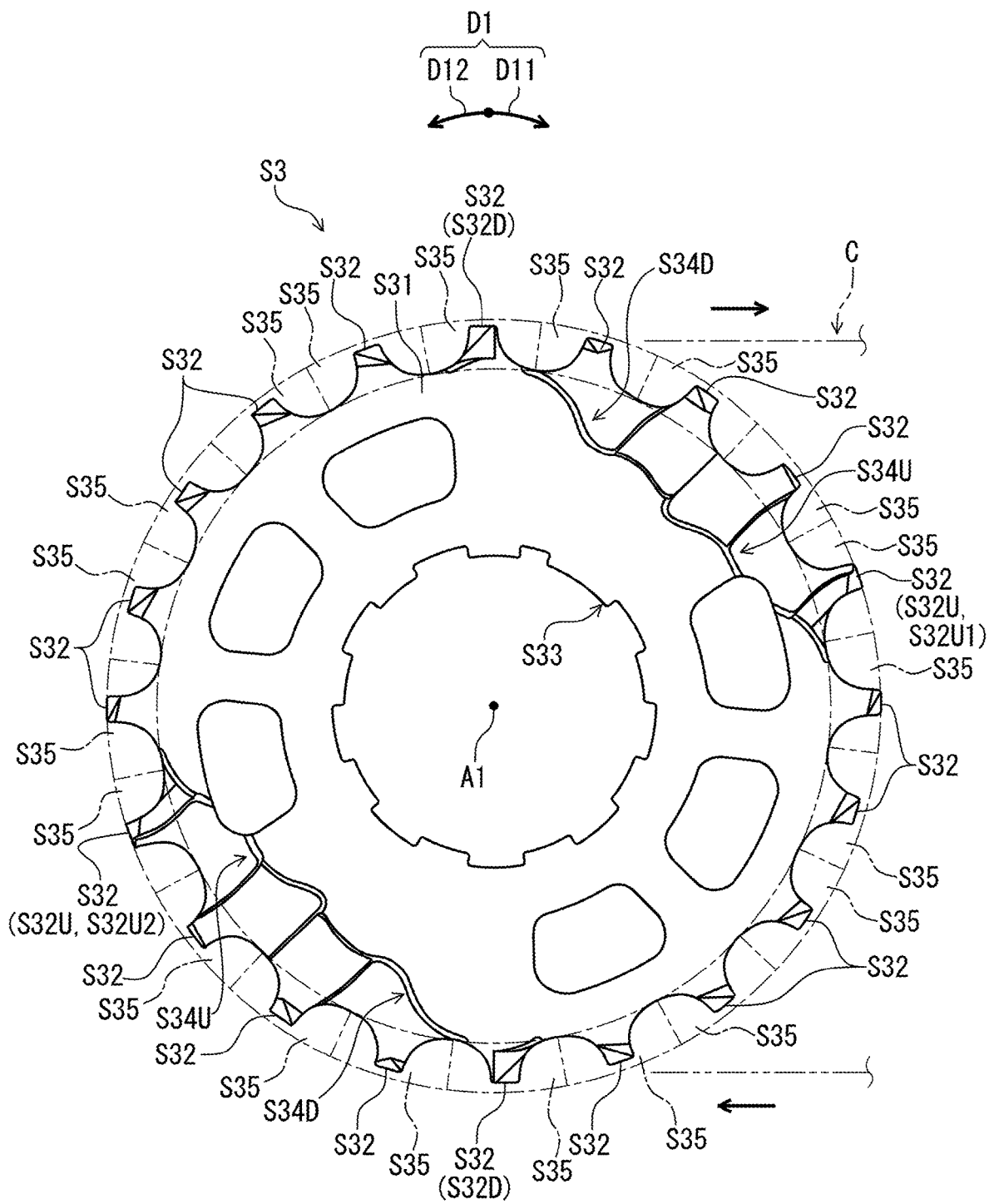
FIG. 9 is a side elevational view of another sprocket of the bicycle sprocket arrangement illustrated in FIG. 1.

As seen in FIG. 9, the third intermediate sprocket S3 includes a sprocket body S31 and a plurality of sprocket teeth S32. The sprocket body S31 includes a hub engagement part S33 configured to be engaged with the bicycle hub assembly H. The plurality of sprocket teeth S32 extends radially outwardly from the sprocket body S31 with respect to the rotational center axis A1. The third outer diameter DM3 (FIG. 2) is defined by at least one tooth of the plurality of sprocket teeth S32 with respect to the rotational center axis A1.

The third intermediate sprocket S3 has a third total tooth-space number. The third total tooth-space number corresponds to a total number of the plurality of sprocket teeth S32 of the third intermediate sprocket S3 in this embodiment. The plurality of intermediate sprockets SM each of which has a total tooth-space number that is an even number. In this embodiment, the third intermediate sprocket S3 has a total tooth-space number which is 20. However, the third total tooth-space number is not limited to this embodiment. The third total tooth-space number can be an odd number.

The third intermediate sprocket S3 includes a plurality of tooth-spaces S35. The plurality of tooth-spaces S35 is provided radially outwardly of the sprocket body S31 and arranged at an equal pitch in the circumferential direction D1. The sprocket teeth S32 are respectively disposed in the tooth-spaces S35. The tooth-space S35 is defined by a root circle, an outer diameter circle, and adjacent two radial lines as viewed along the rotational center axis A1. The tooth-space S35 has substantially the same structure as that of the tooth-space SL5. Thus, the tooth-space S35 will not be described in detail here for the sake of brevity.

Figure 10:
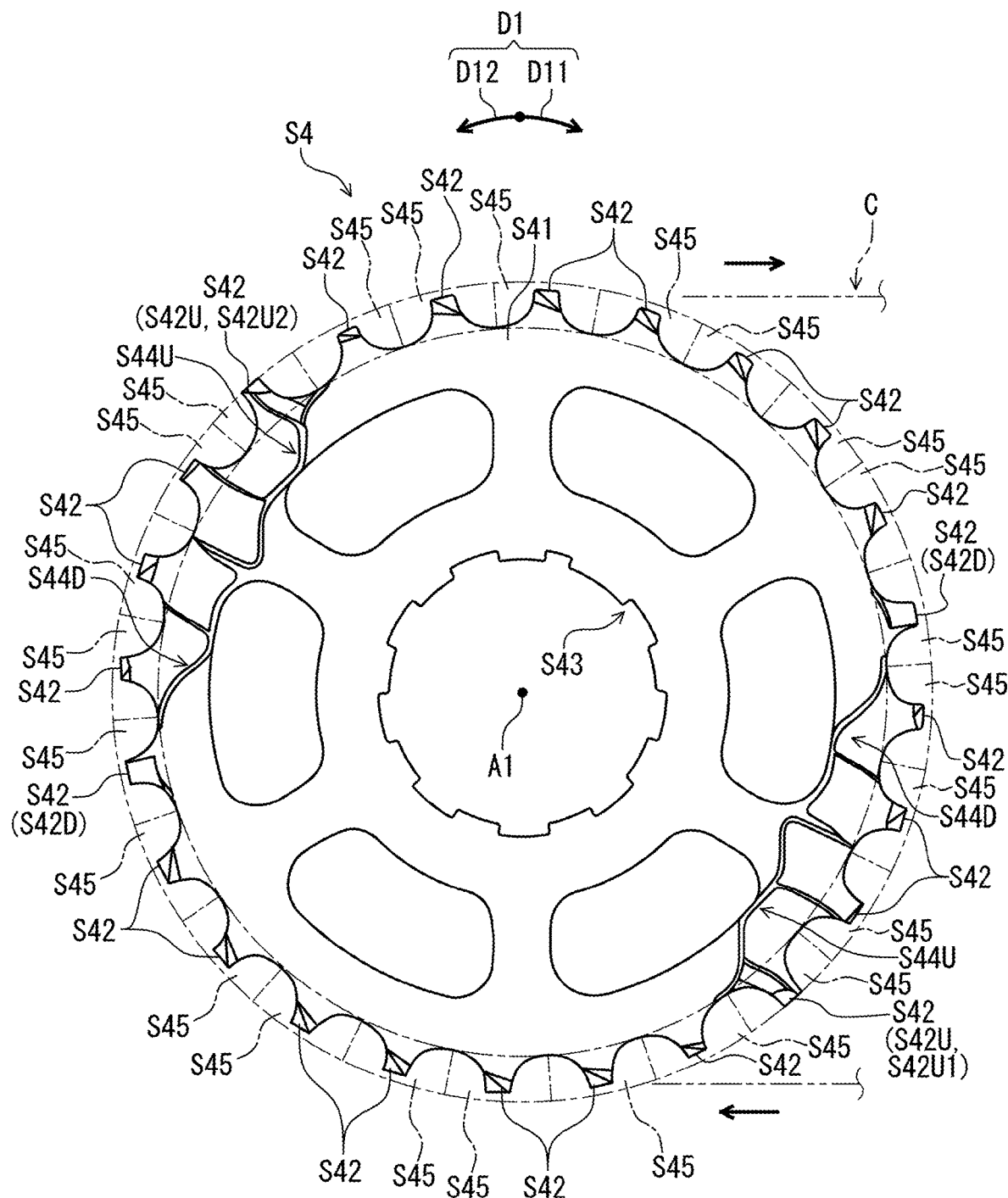
FIG. 10 is a side elevational view of another sprocket of the bicycle sprocket arrangement illustrated in FIG. 1.

As seen in FIG. 10, the fourth intermediate sprocket S4 includes a sprocket body S41 and a plurality of sprocket teeth S42. The sprocket body S41 includes a hub engagement part S43 configured to be engaged with the bicycle hub assembly H. The plurality of sprocket teeth S42 extends radially outwardly from the sprocket body S41 with respect to the rotational center axis A1. The fourth outer diameter DM4 (FIG. 2) is defined by at least one tooth of the plurality of sprocket teeth S42 with respect to the rotational center axis A1.

The fourth intermediate sprocket S4 has a fourth total tooth-space number. The fourth total tooth-space number corresponds to a total number of the plurality of sprocket teeth S42 of the fourth intermediate sprocket S4 in this embodiment. The plurality of intermediate sprockets SM each of which has a total tooth-space number that is an even number. In this embodiment, the fourth intermediate sprocket S4 has a total tooth-space number which is 24. However, the fourth total tooth-space number is not limited to this embodiment. The fourth total tooth-space number can be an odd number.

The fourth intermediate sprocket S4 includes a plurality of tooth-spaces S45. The plurality of tooth-spaces S45 is provided radially outwardly of the sprocket body S41 and arranged at an equal pitch in the circumferential direction D1. The sprocket teeth S42 are respectively disposed in the tooth-spaces S45. The tooth-space S45 is defined by a root circle, an outer diameter circle, and adjacent two radial lines as viewed along the rotational center axis A1. The tooth-space S45 has substantially the same structure as that of the tooth-space SL5. Thus, the tooth-space S45 will not be described in detail here for the sake of brevity.

Figure 11:
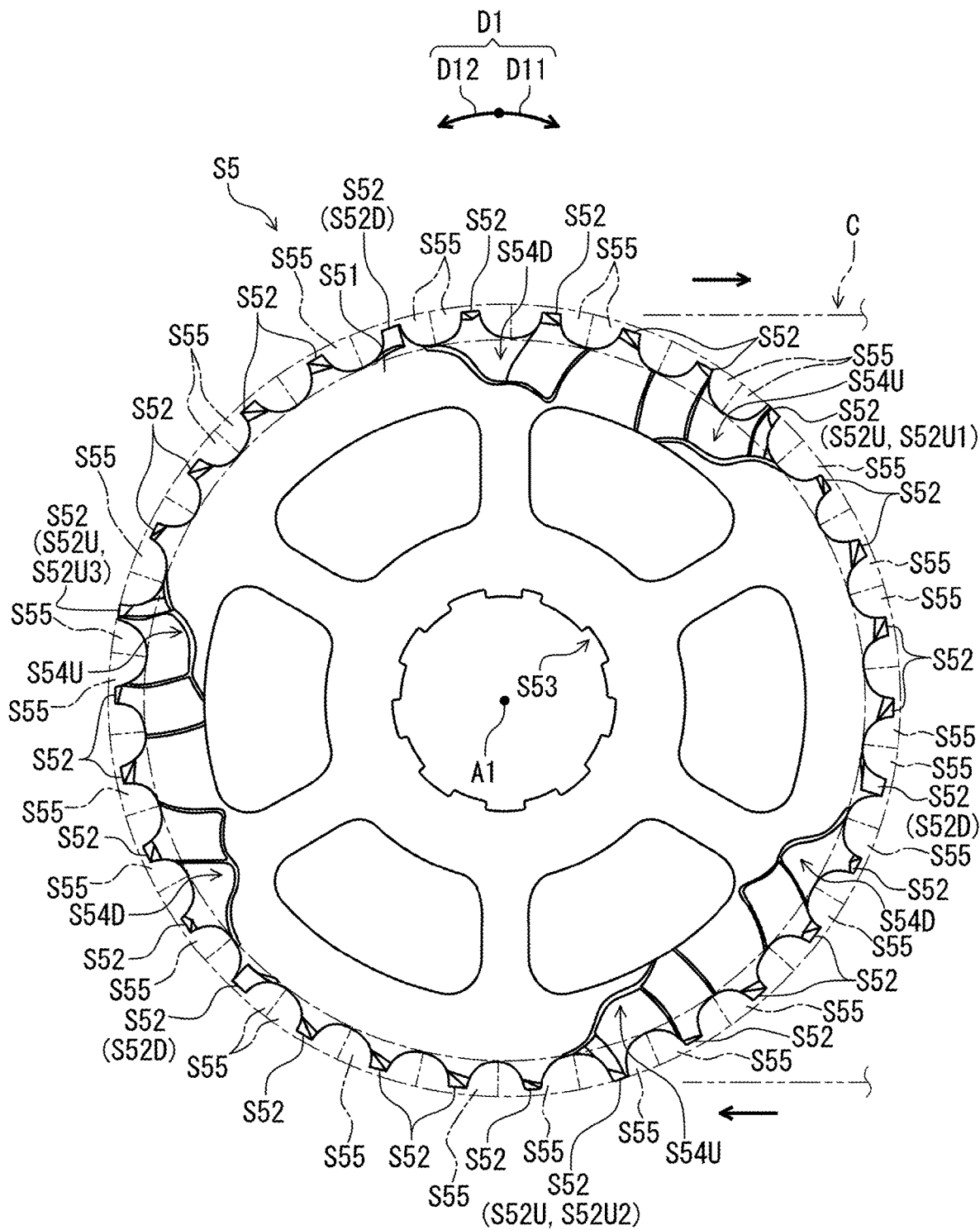
FIG. 11 is a side elevational view of another sprocket of the bicycle sprocket arrangement illustrated in FIG. 1.

As seen in FIG. 11, the fifth intermediate sprocket S5 includes a sprocket body S51 and a plurality of sprocket teeth S52. The sprocket body S51 includes a hub engagement part 53 configured to be engaged with the bicycle hub assembly H. The plurality of sprocket teeth S52 extends radially outwardly from the sprocket body S51 with respect to the rotational center axis A1. The fifth outer diameter DM5 (FIG. 2) is defined by at least one tooth of the plurality of sprocket teeth S52 with respect to the rotational center axis A1.

The fifth intermediate sprocket S5 has a fifth total tooth-space number. The fifth total tooth-space number corresponds to a total number of the plurality of sprocket teeth S52 of the fifth intermediate sprocket S5 in this embodiment. The plurality of intermediate sprockets SM each of which has a total tooth-space number that is an even number. In this embodiment, the fifth intermediate sprocket S5 has a total tooth-space number which is 30. However, the fifth total tooth-space number is not limited to this embodiment. The fifth total tooth-space number can be an odd number.

The fifth intermediate sprocket S5 includes a plurality of tooth-spaces S55. The plurality of tooth-spaces S55 is provided radially outwardly of the sprocket body S51 and arranged at an equal pitch in the circumferential direction D1. The sprocket teeth S52 are respectively disposed in the tooth-spaces S55. The tooth-space S55 is defined by a root circle, an outer diameter circle, and adjacent two radial lines as viewed along the rotational center axis A1. The tooth-space S55 has substantially the same structure as that of the tooth-space SL5. Thus, the tooth-space S55 will not be described in detail here for the sake of brevity.

Figure 12:
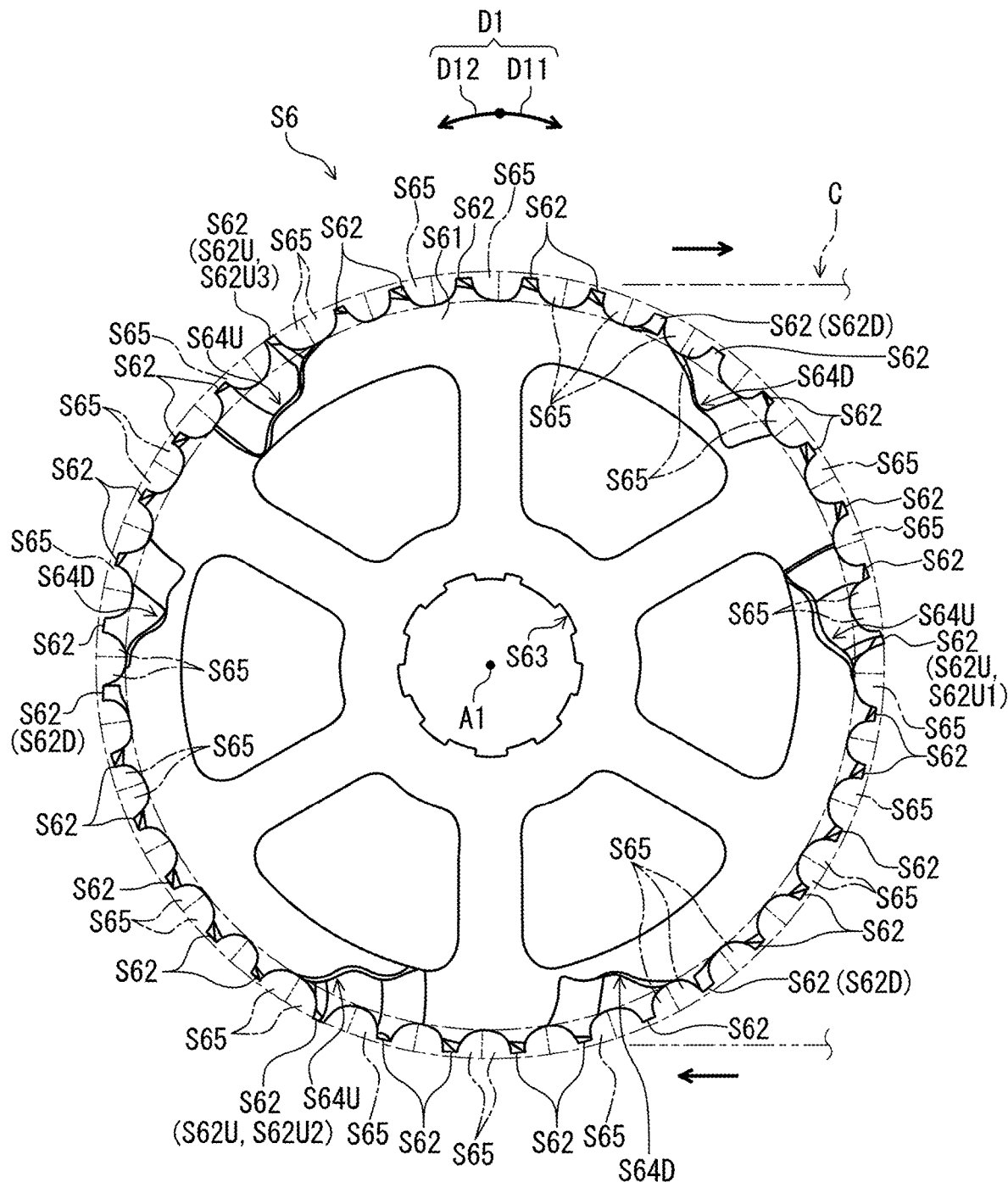
FIG. 12 is a side elevational view of another sprocket of the bicycle sprocket arrangement illustrated in FIG. 1.

As seen in FIG. 12, the sixth intermediate sprocket S6 includes a sprocket body S61 and a plurality of sprocket teeth S62. The sprocket body S61 includes a hub engagement part 63 configured to be engaged with the bicycle hub assembly H. The plurality of sprocket teeth S62 extends radially outwardly from the sprocket body S61 with respect to the rotational center axis A1. The sixth outer diameter DM6 (FIG. 2) is defined by at least one tooth of the plurality of sprocket teeth S62 with respect to the rotational center axis A1.

The sixth intermediate sprocket S6 has a sixth total tooth-space number. The sixth total tooth-space number corresponds to a total number of the plurality of sprocket teeth S62 of the sixth intermediate sprocket S6 in this embodiment. The plurality of intermediate sprockets SM each of which has a total tooth-space number that is an even number. In this embodiment, the sixth intermediate sprocket S6 has a total tooth-space number which is 36. However, the sixth total tooth-space number is not limited to this embodiment. The sixth total tooth-space number can be an odd number.

The sixth intermediate sprocket S6 includes a plurality of tooth-spaces S65. The plurality of tooth-spaces S65 is provided radially outwardly of the sprocket body S61 and arranged at an equal pitch in the circumferential direction D1. The sprocket teeth S62 are respectively disposed in the tooth-spaces S65. The tooth-space S65 is defined by a root circle, an outer diameter circle, and adjacent two radial lines as viewed along the rotational center axis A1. The tooth-space S65 has substantially the same structure as that of the tooth-space SL5. Thus, the tooth-space S65 will not be described in detail here for the sake of brevity.

Figure 13:
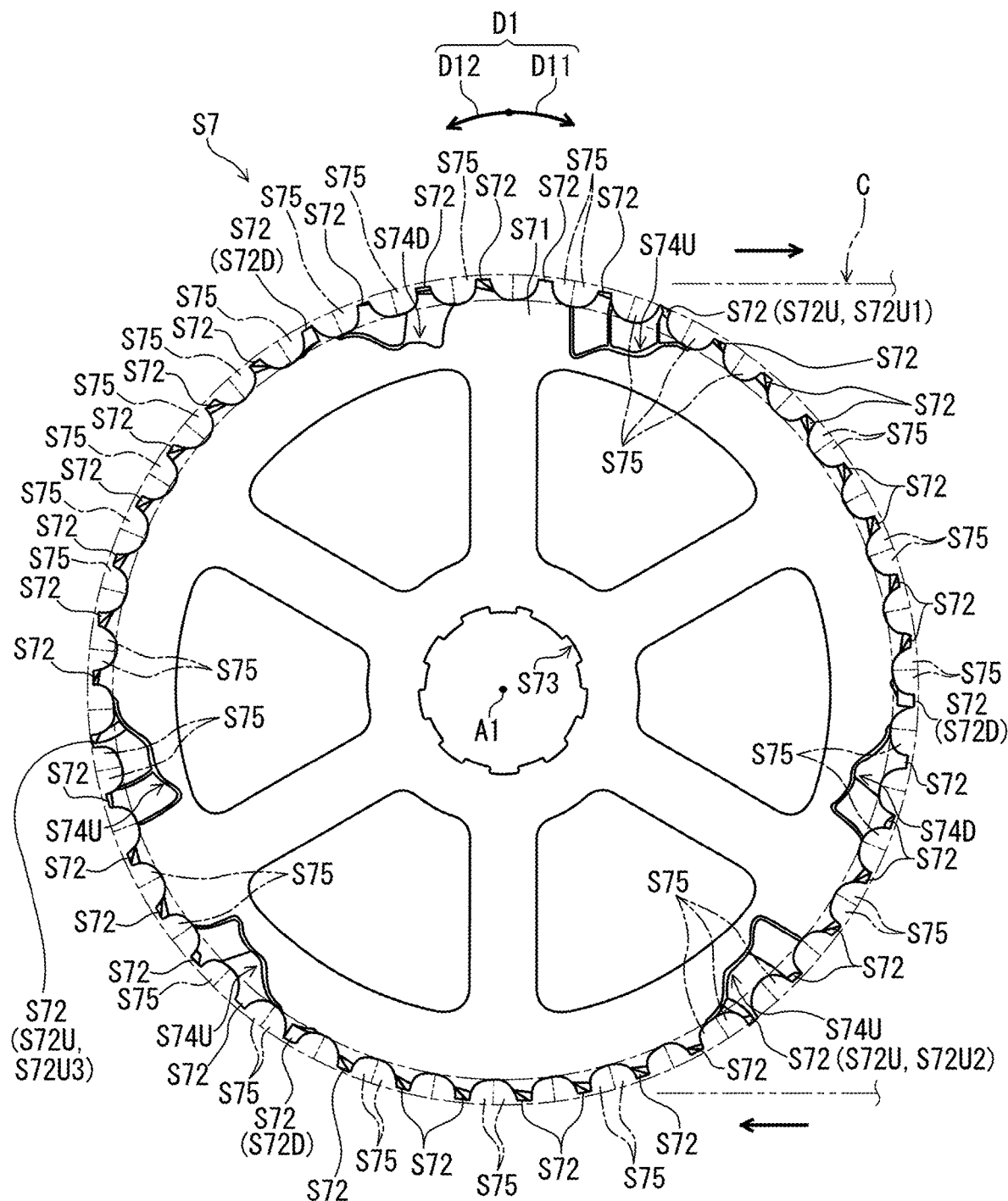
FIG. 13 is a side elevational view of another sprocket of the bicycle sprocket arrangement illustrated in FIG. 1.

As seen in FIG. 13, the seventh intermediate sprocket S7 includes a sprocket body S71 and a plurality of sprocket teeth S72. The sprocket body S71 includes a hub engagement part 73 configured to be engaged with the bicycle hub assembly H. The plurality of sprocket teeth S72 extends radially outwardly from the sprocket body S71 with respect to the rotational center axis A1. The seventh outer diameter DM7 (FIG. 2) is defined by at least one tooth of the plurality of sprocket teeth S72 with respect to the rotational center axis A1.

The seventh intermediate sprocket S7 has a seventh total tooth-space number. The seventh total tooth-space number corresponds to a total number of the plurality of sprocket teeth S72 of the seventh intermediate sprocket S7 in this embodiment. The plurality of intermediate sprockets SM each of which has a total tooth-space number that is an even number. In this embodiment, the seventh intermediate sprocket S7 has a total tooth-space number which is 42. However, the seventh total tooth-space number is not limited to this embodiment. The seventh total tooth-space number can be an odd number.

The seventh intermediate sprocket S7 includes a plurality of tooth-spaces S75. The plurality of tooth-spaces S75 is provided radially outwardly of the sprocket body S71 and arranged at an equal pitch in the circumferential direction D1. The sprocket teeth S72 are respectively disposed in the tooth-spaces S75. The tooth-space S75 is defined by a root circle, an outer diameter circle, and adjacent two radial lines as viewed along the rotational center axis A1. The tooth-space S75 has substantially the same structure as that of the tooth-space SL5. Thus, the tooth-space S75 will not be described in detail here for the sake of brevity.

As seen in FIG. 14, the plurality of intermediate sprockets SM has a tooth-space number difference TND. The tooth-space number difference TND is defined as a difference between a total tooth-space number of a large sprocket among the plurality of intermediate sprockets SM and a total tooth-space number of a small sprocket among the plurality of intermediate sprockets SM and the smallest sprocket SS. The large sprocket and the small sprocket are adjacent to each other without another sprocket therebetween in an axial direction D2 with respect to the rotational center axis A1. Each of the first to seventh intermediate sprockets S1 to S7 can also be referred to as a large sprocket. Each of the first to sixth intermediate sprockets S1 to S6 and the smallest sprocket SS can also be referred to as a small sprocket. The large sprocket has an outer diameter larger than an outer diameter of the small sprocket.

For example, a tooth-space number difference TND1 is defined as a difference between the total tooth-space number of the large sprocket S1 among the plurality of intermediate sprockets SM and a total tooth-space number of the small sprocket SS among the plurality of intermediate sprockets SM and the smallest sprocket SS. A tooth-space number difference TND2 is defined as a difference between the total tooth-space number of the large sprocket S2 among the plurality of intermediate sprockets SM and a total tooth-space number of the small sprocket S1 among the plurality of intermediate sprockets SM and the smallest sprocket SS. A tooth-space number difference TND3 is defined as a difference between the total tooth-space number of the large sprocket S3 among the plurality of intermediate sprockets SM and a total tooth-space number of the small sprocket S2 among the plurality of intermediate sprockets SM and the smallest sprocket SS. A tooth-space number difference TND4 is defined as a difference between the total tooth-space number of the large sprocket S4 among the plurality of intermediate sprockets SM and a total tooth-space number of the small sprocket S3 among the plurality of intermediate sprockets SM and the smallest sprocket SS. A tooth-space number difference TND5 is defined as a difference between the total tooth-space number of the large sprocket S5 among the plurality of intermediate sprockets SM and a total tooth-space number of the small sprocket S4 among the plurality of intermediate sprockets SM and the smallest sprocket SS. A tooth-space number difference TND6 is defined as a difference between the total tooth-space number of the large sprocket S6 among the plurality of intermediate sprockets SM and a total tooth-space number of the small sprocket S5 among the plurality of intermediate sprockets SM and the smallest sprocket SS. A tooth-space number difference TND7 is defined as a difference between the total tooth-space number of the large sprocket S7 among the plurality of intermediate sprockets SM and a total tooth-space number of the small sprocket S6 among the plurality of intermediate sprockets SM and the smallest sprocket SS.

The tooth-space number difference TND is two with respect to at least two sprockets of the plurality of intermediate sprockets SM. In this embodiment, the tooth-space number difference TND1 is two. The tooth-space number difference TND2 is two. The tooth-space number difference TND3 is four. The tooth-space number difference TND4 is four. The tooth-space number difference TND5 is six. The tooth-space number difference TND6 is six. The tooth-space number difference TND7 is six. However, the tooth-space number difference is not limited to this embodiment.

As seen in FIG. 14, a first quotient QT1 is obtained if the total tooth-space number of the large sprocket is divided by a half of the tooth-space number difference TND. The first quotient QT1 is an even number with respect to all sprockets of the plurality of intermediate sprockets SM. In this embodiment, a first quotient QT11 is obtained if the total tooth-space number of the large sprocket S1 is divided by a half of the tooth-space number difference TND1. A first quotient QT12 is obtained if the total tooth-space number of the large sprocket S2 is divided by a half of the tooth-space number difference TND2. A first quotient QT13 is obtained if the total tooth-space number of the large sprocket S3 is divided by a half of the tooth-space number difference TND3. A first quotient QT14 is obtained if the total tooth-space number of the large sprocket S4 is divided by a half of the tooth-space number difference TND4. A first quotient QT15 is obtained if the total tooth-space number of the large sprocket S5 is divided by a half of the tooth-space number difference TND5. A first quotient QT16 is obtained if the total tooth-space number of the large sprocket S6 is divided by a half of the tooth-space number difference TND6. A first quotient QT17 is obtained if the total tooth-space number of the large sprocket S7 is divided by a half of the tooth-space number difference TND7.

A second quotient QT2 is obtained if the total tooth-space number of the small sprocket is divided by a half of the tooth-space number difference TND. The second quotient QT2 is an even number with respect to all sprockets of the plurality of intermediate sprockets SM excluding a largest intermediate sprocket of the plurality of intermediate sprockets SM. In this embodiment, a second quotient QT21 is obtained if the total tooth-space number of the small sprocket SS is divided by a half of the tooth-space number difference TND1. A second quotient QT22 is obtained if the total tooth-space number of the small sprocket S1 is divided by a half of the tooth-space number difference TND2. A second quotient QT23 is obtained if the total tooth-space number of the small sprocket S2 is divided by a half of the tooth-space number difference TND3. A second quotient QT24 is obtained if the total tooth-space number of the small sprocket S3 is divided by a half of the tooth-space number difference TND4. A second quotient QT25 is obtained if the total tooth-space number of the small sprocket S4 is divided by a half of the tooth-space number difference TND5. A second quotient QT26 is obtained if the total tooth-space number of the small sprocket S5 is divided by a half of the tooth-space number difference TND6. A second quotient QT27 is obtained if the total tooth-space number of the small sprocket S6 is divided by a half of the tooth-space number difference TND7.

As seen in FIG. 3, the largest sprocket SL includes an upshifting initiation tooth SL2U and an additional upshifting initiation tooth SL2U. The upshifting initiation tooth SL2U of the largest sprocket SL is configured to initially disengage from the bicycle chain C in an upshifting operation in which the bicycle chain C is shifted from the largest sprocket SL to a neighboring smaller sprocket S7 (FIG. 2) of the plurality of intermediate sprockets SM. The additional upshifting initiation tooth SL2U of the largest sprocket SL is configured to initially disengage from the bicycle chain C in another upshifting operation in which the bicycle chain C is shifted from the largest sprocket SL to the neighboring smaller sprocket S7 (FIG. 2) of the plurality of intermediate sprockets SM.

In this embodiment, the largest sprocket SL includes an upshifting initiation tooth SL2U1 and an additional upshifting initiation tooth SL2U2. The upshifting initiation tooth SL2U1 of the largest sprocket SL is configured to initially disengage from the bicycle chain C in an upshifting operation in which the bicycle chain C is shifted from the largest sprocket SL to the neighboring smaller sprocket S7 (FIG. 2) of the plurality of intermediate sprockets SM. The additional upshifting initiation tooth SL2U2 of the largest sprocket SL is configured to initially disengage from the bicycle chain C in another upshifting operation in which the bicycle chain C is shifted from the largest sprocket SL to the neighboring smaller sprocket S7 (FIG. 2) of the plurality of intermediate sprockets SM.

The largest sprocket SL further includes upshifting initiation teeth SL2U3 and SL2U4. The upshifting initiation tooth SL2U3 of the largest sprocket SL is configured to initially disengage from the bicycle chain C in another upshifting operation in which the bicycle chain C is shifted from the largest sprocket SL to the neighboring smaller sprocket S7 (FIG. 2) of the plurality of intermediate sprockets SM. The upshifting initiation tooth SL2U4 of the largest sprocket SL is configured to initially disengage from the bicycle chain C in another upshifting operation in which the bicycle chain C is shifted from the largest sprocket SL to the neighboring smaller sprocket S7 (FIG. 2) of the plurality of intermediate sprockets SM.

The upshifting initiation tooth SL2U1 and the additional upshifting initiation tooth SL2U2 are spaced apart from each other without another upshifting initiation tooth therebetween in the circumferential direction D1 with respect to the rotational center axis A1 of the bicycle sprocket arrangement 10. The additional upshifting initiation tooth SL2U2 and the upshifting initiation tooth SL2U3 are spaced apart from each other without another upshifting initiation tooth therebetween in the circumferential direction D1 with respect to the rotational center axis A1 of the bicycle sprocket arrangement 10. The upshifting initiation teeth SL2U3 and SL2U4 are spaced apart from each other without another upshifting initiation tooth therebetween in the circumferential direction D1 with respect to the rotational center axis A1 of the bicycle sprocket arrangement 10. The upshifting initiation teeth SL2U1 and SL2U4 are spaced apart from each other without another upshifting initiation tooth therebetween in the circumferential direction D1 with respect to the rotational center axis A1 of the bicycle sprocket arrangement 10.

An even number of tooth-spaces SL25 (e.g., six tooth-spaces SL25 in this embodiment) is disposed between the upshifting initiation tooth SL2U1 and the additional upshifting initiation tooth SL2U2 in the circumferential direction D1. An odd number of tooth-spaces SL25 (e.g., 13 tooth-spaces SL25 in this embodiment) are disposed between the additional upshifting initiation tooth SL2U2 and the upshifting initiation tooth SL2U3 in the circumferential direction D1. An odd number of tooth-spaces SL25 (e.g., seven tooth-spaces SL25 in this embodiment) are disposed between the upshifting initiation teeth SL2U3 and SL2U4 in the circumferential direction D1. An odd number of tooth-spaces SL25 (e.g., 19 tooth-spaces SL25 in this embodiment) are disposed between the upshifting initiation teeth SL2U1 and SL2U4 in the circumferential direction D1.

The largest sprocket SL includes at least one downshifting initiation tooth SL2D. In this embodiment, the largest sprocket SL includes a plurality of downshifting initiation teeth SL2D. The at least one downshifting initiation tooth SL2D is configured to initially receive the bicycle chain C engaged with the neighboring smaller sprocket S7 (FIG. 2) of the plurality of intermediate sprockets SM in a downshifting operation in which the bicycle chain C is shifted from the neighboring smaller sprocket S7 (FIG. 2) of the plurality of intermediate sprockets SM to the largest sprocket SL.

The largest sprocket SL includes a plurality of upshifting facilitation recesses SL4U. The upshifting facilitation recess SL4U is configured to reduce interference between the largest sprocket SL and the bicycle chain C in the upshifting operation. The upshifting initiation tooth SL2U1 is provided in the upshifting facilitation recess SL4U. The additional upshifting initiation tooth SL2U2 is provided in the upshifting facilitation recess SL4U. The upshifting initiation tooth SL2U3 is provided in the upshifting facilitation recess SL4U. The upshifting initiation tooth SL2U4 is provided in the upshifting facilitation recess SL4U.

The largest sprocket SL includes a plurality of downshifting facilitation recesses SL4D. The downshifting facilitation recess SL4D is configured to reduce interference between the largest sprocket SL and the bicycle chain C in the downshifting operation. The downshifting initiation tooth SL2D is provided adjacent to the downshifting facilitation recess SL4D without another tooth therebetween in the circumferential direction D1. The downshifting initiation tooth SL2D is provided on an upstream side of the downshifting facilitation recess SL4D in the driving rotational direction D11.

As seen in FIG. 13, at least one sprocket of the plurality of intermediate sprockets SM includes an upshifting initiation tooth and an additional upshifting initiation tooth. The at least one sprocket of the plurality of intermediate sprockets SM includes at least one upshifting initiation tooth. The seventh intermediate sprocket S7 includes an upshifting initiation tooth S72U and an additional upshifting initiation tooth S72U. The upshifting initiation tooth S72U of the seventh intermediate sprocket S7 is configured to initially disengage from the bicycle chain C in an upshifting operation in which the bicycle chain C is shifted from the seventh intermediate sprocket S7 to a neighboring smaller sprocket S6 (FIG. 2) of the plurality of intermediate sprockets SM. The additional upshifting initiation tooth S72U of the seventh intermediate sprocket S7 is configured to initially disengage from the bicycle chain C in another upshifting operation in which the bicycle chain C is shifted from the seventh intermediate sprocket S7 to the neighboring smaller sprocket S6 (FIG. 2) of the plurality of intermediate sprockets SM.

In this embodiment, the seventh intermediate sprocket S7 includes an upshifting initiation tooth S72U1 and an additional upshifting initiation tooth S72U2. The upshifting initiation tooth S72U1 of the seventh intermediate sprocket S7 is configured to initially disengage from the bicycle chain C in an upshifting operation in which the bicycle chain C is shifted from the seventh intermediate sprocket S7 to the neighboring smaller sprocket S6 (FIG. 2) of the plurality of intermediate sprockets SM. The additional upshifting initiation tooth S72U2 of the seventh intermediate sprocket S7 is configured to initially disengage from the bicycle chain C in another upshifting operation in which the bicycle chain C is shifted from the seventh intermediate sprocket S7 to the neighboring smaller sprocket S6 (FIG. 2) of the plurality of intermediate sprockets SM.

The seventh intermediate sprocket S7 further includes an upshifting initiation tooth S72U3. The upshifting initiation tooth S72U3 of the seventh intermediate sprocket S7 is configured to initially disengage from the bicycle chain C in another upshifting operation in which the bicycle chain C is shifted from the seventh intermediate sprocket S7 to the neighboring smaller sprocket S6 (FIG. 2) of the plurality of intermediate sprockets SM.

The tooth-space number difference TND7 between the sixth and seventh intermediate sprockets S6 and S7 indicates a maximum total number of upshifting and downshifting initiation teeth that can be provided in the seventh intermediate sprocket S7.

The upshifting initiation tooth S72U 1 and the additional upshifting initiation tooth S72U2 are spaced apart from each other without another upshifting initiation tooth therebetween in the circumferential direction D1. The additional upshifting initiation tooth S72U2 and the upshifting initiation tooth S72U3 are spaced apart from each other without another upshifting initiation tooth therebetween in the circumferential direction D1. The upshifting initiation tooth S72U1 and the upshifting initiation tooth S72U3 are spaced apart from each other without another upshifting initiation tooth therebetween in the circumferential direction D1.

An odd number of tooth-spaces S75 is disposed between the upshifting initiation tooth S72U of the at least one sprocket (e.g., the seventh intermediate sprocket S7) of the plurality of intermediate sprockets SM and the additional upshifting initiation tooth S72U of the at least one sprocket (e.g., the seventh intermediate sprocket S7) of the plurality of intermediate sprockets SM in the circumferential direction D1. In this embodiment, an odd number of tooth-spaces S75 (e.g., 13 tooth-spaces S75 in this embodiment) are disposed between the upshifting initiation tooth S72U1 of the seventh intermediate sprocket S7) of the plurality of intermediate sprockets SM and the additional upshifting initiation tooth S72U2 of the seventh intermediate sprocket S7 of the plurality of intermediate sprockets SM in the circumferential direction D1. An odd number of tooth-spaces S75 (e.g., 13 tooth-spaces S75 in this embodiment) are disposed between the upshifting initiation tooth S72U2 of the seventh intermediate sprocket S7 and the upshifting initiation tooth S72U3 of the seventh intermediate sprocket S7 in the circumferential direction D1. An odd number of tooth-spaces S75 (e.g., 13 tooth-spaces S75 in this embodiment) are disposed between the upshifting initiation tooth S72U1 of the seventh intermediate sprocket S7 and the upshifting initiation tooth S72U3 of the seventh intermediate sprocket S7 in the circumferential direction D1.

The at least one sprocket of the plurality of intermediate sprockets SM includes at least one downshifting initiation tooth S72D. Thus, the at least one sprocket of the plurality of intermediate sprockets SM can include the at least one upshifting initiation tooth S72U and the at least one downshifting initiation tooth S72D. In this embodiment, the seventh intermediate sprocket S7 includes a plurality of downshifting initiation teeth S72D. The at least one downshifting initiation tooth S72D is configured to initially receive the bicycle chain C engaged with the neighboring smaller sprocket S6 (FIG. 2) of the plurality of intermediate sprockets SM in a downshifting operation in which the bicycle chain C is shifted from the neighboring smaller sprocket S6 (FIG. 2) of the plurality of intermediate sprockets SM to the seventh intermediate sprocket S7.

The seventh intermediate sprocket S7 includes a plurality of upshifting facilitation recesses S74U. The upshifting facilitation recess S74U is configured to reduce interference between the seventh intermediate sprocket S7 and the bicycle chain C in the upshifting operation. The upshifting initiation tooth S72U1 is provided in the upshifting facilitation recess S74U. The additional upshifting initiation tooth S72U2 is provided in the upshifting facilitation recess S74U. The upshifting initiation tooth S72U3 is provided in the upshifting facilitation recess S74U. The upshifting initiation tooth S72U4 is provided in the upshifting facilitation recess S74U.

The seventh intermediate sprocket S7 includes a plurality of downshifting facilitation recesses S74D. The downshifting facilitation recess S74D is configured to reduce interference between the seventh intermediate sprocket S7 and the bicycle chain C in the downshifting operation. The downshifting initiation tooth S72D is provided adjacent to the downshifting facilitation recess S74D without another tooth therebetween in the circumferential direction D. The downshifting initiation tooth S72D is provided on an upstream side of the downshifting facilitation recess S74D in the driving rotational direction D11.

As seen in FIG. 12, at least one sprocket of the plurality of intermediate sprockets SM includes an upshifting initiation tooth and an additional upshifting initiation tooth. The at least one sprocket of the plurality of intermediate sprockets SM includes at least one upshifting initiation tooth. The sixth intermediate sprocket S6 includes upshifting initiation tooth S62U and an additional upshifting initiation tooth S62U. The upshifting initiation tooth S62U of the sixth intermediate sprocket S6 is configured to initially disengage from the bicycle chain C in an upshifting operation in which the bicycle chain C is shifted from the sixth intermediate sprocket S6 to a neighboring smaller sprocket S5 (FIG. 2) of the plurality of intermediate sprockets SM. The additional upshifting initiation tooth S62U of the sixth intermediate sprocket S6 is configured to initially disengage from the bicycle chain C in another upshifting operation in which the bicycle chain C is shifted from the sixth intermediate sprocket S6 to the neighboring smaller sprocket S5 (FIG. 2) of the plurality of intermediate sprockets SM.

In this embodiment, the sixth intermediate sprocket S6 includes a plurality of upshifting initiation teeth S62U 1, S62U2, and S62U3. The upshifting initiation teeth S62U 1, S62U2, and S62U3 can also be referred to as additional upshifting initiation teeth S62U1, S62U2, and S62U3, respectively. The upshifting initiation tooth S62U1 of the sixth intermediate sprocket S6 is configured to initially disengage from the bicycle chain C in an upshifting operation in which the bicycle chain C is shifted from the sixth intermediate sprocket S6 to the neighboring smaller sprocket S5 (FIG. 2) of the plurality of intermediate sprockets SM. The upshifting initiation tooth S62U2 of the sixth intermediate sprocket S6 is configured to initially disengage from the bicycle chain C in another upshifting operation in which the bicycle chain C is shifted from the sixth intermediate sprocket S6 to the neighboring smaller sprocket S5 (FIG. 2) of the plurality of intermediate sprockets SM. The upshifting initiation tooth S62U3 of the sixth intermediate sprocket S6 is configured to initially disengage from the bicycle chain C in another upshifting operation in which the bicycle chain C is shifted from the sixth intermediate sprocket S6 to the neighboring smaller sprocket S5 (FIG. 2) of the plurality of intermediate sprockets SM.

The tooth-space number difference TND6 between the fifth and sixth intermediate sprockets S5 and S6 indicates a maximum total number of upshifting and downshifting initiation teeth that can be provided in the sixth intermediate sprocket S6.

The upshifting initiation tooth S62U1 and the additional upshifting initiation tooth S62U2 are spaced apart from each other without another upshifting initiation tooth therebetween in the circumferential direction D1. The upshifting initiation tooth S62U2 and the additional upshifting initiation tooth S62U3 are spaced apart from each other without another upshifting initiation tooth therebetween in the circumferential direction D1. The upshifting initiation tooth S62U3 and the additional upshifting initiation tooth S62U1 are spaced apart from each other without another upshifting initiation tooth therebetween in the circumferential direction D1.

An odd number of tooth-spaces S65 is disposed between the upshifting initiation tooth S62U of the at least one sprocket (e.g., the sixth intermediate sprocket S6) of the plurality of intermediate sprockets SM and the additional upshifting initiation tooth S62U of the at least one sprocket (e.g., the sixth intermediate sprocket S6) of the plurality of intermediate sprockets SM in the circumferential direction D1. In this embodiment, an odd number of tooth-spaces S65 (e.g., 11 tooth-spaces S65 in this embodiment) are disposed between the upshifting initiation tooth S62U1 of the sixth intermediate sprocket S6 of the plurality of intermediate sprockets SM and the additional upshifting initiation tooth S62U2 of the sixth intermediate sprocket S6 of the plurality of intermediate sprockets SM in the circumferential direction D1. An odd number of tooth-spaces S65 (e.g., 11 tooth-spaces S65 in this embodiment) are disposed between the upshifting initiation tooth S62U2 of the sixth intermediate sprocket S6 and the upshifting initiation tooth S62U3 of the sixth intermediate sprocket S6 in the circumferential direction D1. An odd number of tooth-spaces S65 (e.g., 11 tooth-spaces S65 in this embodiment) are disposed between the upshifting initiation tooth S62U1 of the sixth intermediate sprocket S6 and the upshifting initiation tooth S62U3 of the sixth intermediate sprocket S6 in the circumferential direction D1.

The at least one sprocket of the plurality of intermediate sprockets SM includes at least one downshifting initiation tooth S62D. In this embodiment, the sixth intermediate sprocket S6 includes a plurality of downshifting initiation teeth S62D. The at least one downshifting initiation tooth S62D is configured to initially receive the bicycle chain C engaged with the neighboring smaller sprocket S5 (FIG. 2) of the plurality of intermediate sprockets SM in a downshifting operation in which the bicycle chain C is shifted from the neighboring smaller sprocket S5 (FIG. 2) of the plurality of intermediate sprockets SM to the sixth intermediate sprocket S6.

The sixth intermediate sprocket S6 includes a plurality of upshifting facilitation recesses S64U. The upshifting facilitation recess S64U is configured to reduce interference between the sixth intermediate sprocket S6 and the bicycle chain C in the upshifting operation. The upshifting initiation tooth S62U1 is provided in the upshifting facilitation recess S64U. The additional upshifting initiation tooth S62U2 is provided in the upshifting facilitation recess S64U. The upshifting initiation tooth S62U3 is provided in the upshifting facilitation recess S64U.

The sixth intermediate sprocket S6 includes a plurality of downshifting facilitation recesses S64D. The downshifting facilitation recess S64D is configured to reduce interference between the sixth intermediate sprocket S6 and the bicycle chain C in the downshifting operation. The downshifting initiation tooth S62D is provided adjacent to the downshifting facilitation recess S64D without another tooth therebetween in the circumferential direction D1. The downshifting initiation tooth S62D is provided on an upstream side of the downshifting facilitation recess S64D in the driving rotational direction D11.

As seen in FIG. 11, at least one sprocket of the plurality of intermediate sprockets SM includes an upshifting initiation tooth and an additional upshifting initiation tooth. The at least one sprocket of the plurality of intermediate sprockets SM includes at least one upshifting initiation tooth. The fifth intermediate sprocket S5 includes upshifting initiation tooth S52U and an additional upshifting initiation tooth S52U. The upshifting initiation tooth S52U of the fifth intermediate sprocket S5 is configured to initially disengage from the bicycle chain C in an upshifting operation in which the bicycle chain C is shifted from the fifth intermediate sprocket S5 to a neighboring smaller sprocket S4 (FIG. 2) of the plurality of intermediate sprockets SM. The additional upshifting initiation tooth S52U of the fifth intermediate sprocket S5 is configured to initially disengage from the bicycle chain C in another upshifting operation in which the bicycle chain C is shifted from the fifth intermediate sprocket S5 to the neighboring smaller sprocket S4 (FIG. 2) of the plurality of intermediate sprockets SM.

In this embodiment, the fifth intermediate sprocket S5 includes a plurality of upshifting initiation teeth S52U1, S52U2, and S52U3. The upshifting initiation teeth S52U1, S52U2, and S52U3 can also be referred to as additional upshifting initiation teeth 552U1, S52U2, and S52U3, respectively. The upshifting initiation tooth S52U1 of the fifth intermediate sprocket S5 is configured to initially disengage from the bicycle chain C in an upshifting operation in which the bicycle chain C is shifted from the fifth intermediate sprocket S5 to the neighboring smaller sprocket S4 (FIG. 2) of the plurality of intermediate sprockets SM. The upshifting initiation tooth S52U2 of the fifth intermediate sprocket S5 is configured to initially disengage from the bicycle chain C in another upshifting operation in which the bicycle chain C is shifted from the fifth intermediate sprocket S5 to the neighboring smaller sprocket S4 (FIG. 2) of the plurality of intermediate sprockets SM. The upshifting initiation tooth S52U3 of the fifth intermediate sprocket S5 is configured to initially disengage from the bicycle chain C in another upshifting operation in which the bicycle chain C is shifted from the fifth intermediate sprocket S5 to the neighboring smaller sprocket S4 (FIG. 2) of the plurality of intermediate sprockets SM.

The tooth-space number difference TND5 between the fourth and fifth intermediate sprockets S4 and S5 indicates a maximum total number of upshifting and downshifting initiation teeth that can be provided in the fifth intermediate sprocket S5.

The upshifting initiation tooth S52U1 and the additional upshifting initiation tooth S52U2 are spaced apart from each other without another upshifting initiation tooth therebetween in the circumferential direction D1. The upshifting initiation tooth S52U2 and the additional upshifting initiation tooth S52U3 are spaced apart from each other without another upshifting initiation tooth therebetween in the circumferential direction D1. The upshifting initiation tooth S52U3 and the additional upshifting initiation tooth S52U1 are spaced apart from each other without another upshifting initiation tooth therebetween in the circumferential direction D1.

An odd number of tooth-spaces S55 is disposed between the upshifting initiation tooth S52U of the at least one sprocket (e.g., the fifth intermediate sprocket S5) of the plurality of intermediate sprockets SM and the additional upshifting initiation tooth S52U of the at least one sprocket (e.g., the fifth intermediate sprocket S5) of the plurality of intermediate sprockets SM in the circumferential direction D1. In this embodiment, an odd number of tooth-spaces S55 (e.g., nine tooth-spaces S55 in this embodiment) is disposed between the upshifting initiation tooth S52U1 of the fifth intermediate sprocket S5 of the plurality of intermediate sprockets SM and the additional upshifting initiation tooth S52U2 of the fifth intermediate sprocket S5 of the plurality of intermediate sprockets SM in the circumferential direction D1. An odd number of tooth-spaces S55 (e.g., nine tooth-spaces S55 in this embodiment) is disposed between the upshifting initiation tooth S52U2 of the fifth intermediate sprocket S5 and the upshifting initiation tooth S52U3 of the fifth intermediate sprocket S5 in the circumferential direction D1. An odd number of tooth-spaces S55 (e.g., tooth-spaces S55 in this embodiment) is disposed between the upshifting initiation tooth S52U1 of the fifth intermediate sprocket S5 and the upshifting initiation tooth S52U3 of the fifth intermediate sprocket S5 in the circumferential direction D1.

The at least one sprocket of the plurality of intermediate sprockets SM includes at least one downshifting initiation tooth S52D. In this embodiment, the fifth intermediate sprocket S5 includes a plurality of downshifting initiation teeth S52D. The at least one downshifting initiation tooth S52D is configured to initially receive the bicycle chain C engaged with the neighboring smaller sprocket S4 (FIG. 2) of the plurality of intermediate sprockets SM in a downshifting operation in which the bicycle chain C is shifted from the neighboring smaller sprocket S4 (FIG. 2) of the plurality of intermediate sprockets SM to the fifth intermediate sprocket S5.

The fifth intermediate sprocket S5 includes a plurality of upshifting facilitation recesses S54U. The upshifting facilitation recess S54U is configured to reduce interference between the fifth intermediate sprocket S5 and the bicycle chain C in the upshifting operation. The upshifting initiation tooth S52U1 is provided in the upshifting facilitation recess S54U. The additional upshifting initiation tooth S52U2 is provided in the upshifting facilitation recess S54U. The upshifting initiation tooth S52U3 is provided in the upshifting facilitation recess S54U.

The fifth intermediate sprocket S5 includes a plurality of downshifting facilitation recesses S54D. The downshifting facilitation recess S54D is configured to reduce interference between the fifth intermediate sprocket S5 and the bicycle chain C in the downshifting operation. The downshifting initiation tooth S52D is provided adjacent to the downshifting facilitation recess S54D without another tooth therebetween in the circumferential direction D1. The downshifting initiation tooth S52D is provided on an upstream side of the downshifting facilitation recess S54D in the driving rotational direction D11.

As seen in FIG. 10, at least one sprocket of the plurality of intermediate sprockets SM includes an upshifting initiation tooth and an additional upshifting initiation tooth. The at least one sprocket of the plurality of intermediate sprockets SM includes at least one upshifting initiation tooth. The fourth intermediate sprocket S4 includes upshifting initiation tooth S42U and an additional upshifting initiation tooth S42U. The upshifting initiation tooth S42U of the fourth intermediate sprocket S4 is configured to initially disengage from the bicycle chain C in an upshifting operation in which the bicycle chain C is shifted from the fourth intermediate sprocket S4 to a neighboring smaller sprocket S3 (FIG. 2) of the plurality of intermediate sprockets SM. The additional upshifting initiation tooth S42U of the fourth intermediate sprocket S4 is configured to initially disengage from the bicycle chain C in another upshifting operation in which the bicycle chain C is shifted from the fourth intermediate sprocket S4 to the neighboring smaller sprocket S3 (FIG. 2) of the plurality of intermediate sprockets SM.

In this embodiment, the fourth intermediate sprocket S4 includes an upshifting initiation tooth S42U1 and an additional upshifting initiation tooth S42U2. The upshifting initiation tooth S42U1 of the fourth intermediate sprocket S4 is configured to initially disengage from the bicycle chain C in an upshifting operation in which the bicycle chain C is shifted from the fourth intermediate sprocket S4 to the neighboring smaller sprocket S3 (FIG. 2) of the plurality of intermediate sprockets SM. The additional upshifting initiation tooth S42U2 of the fourth intermediate sprocket S4 is configured to initially disengage from the bicycle chain C in another upshifting operation in which the bicycle chain C is shifted from the fourth intermediate sprocket S4 to the neighboring smaller sprocket S3 (FIG. 2) of the plurality of intermediate sprockets SM.

The tooth-space number difference TND4 between the third and fourth intermediate sprockets S3 and S4 indicates a maximum total number of upshifting and downshifting initiation teeth that can be provided in the fourth intermediate sprocket S4.

The upshifting initiation tooth S42U1 and the additional upshifting initiation tooth S42U2 are spaced apart from each other without another upshifting initiation tooth therebetween in the circumferential direction D1. The upshifting initiation tooth S42U1 is spaced apart from the additional upshifting initiation tooth S42U2 without another upshifting initiation tooth therebetween in the driving rotational direction D11. The additional upshifting initiation tooth S42U2 is spaced apart from the upshifting initiation tooth S42U1 without another upshifting initiation tooth therebetween in the driving rotational direction D11.

An odd number of tooth-spaces S45 is disposed between the upshifting initiation tooth S42U of the at least one sprocket (e.g., the fourth intermediate sprocket S4) of the plurality of intermediate sprockets SM and the additional upshifting initiation tooth S42U of the at least one sprocket (e.g., the fourth intermediate sprocket S4) of the plurality of intermediate sprockets SM in the circumferential direction D1. In this embodiment, an odd number of tooth-spaces S45 (e.g., 11 tooth-spaces S45 in this embodiment) is disposed between the upshifting initiation tooth S42U1 of the fourth intermediate sprocket S4 of the plurality of intermediate sprockets SM and the additional upshifting initiation tooth S42U2 of the fourth intermediate sprocket S4 of the plurality of intermediate sprockets SM in the circumferential direction D1 on each of an upstream side and a downstream side of the upshifting initiation tooth S42U1.

The at least one sprocket of the plurality of intermediate sprockets SM includes at least one downshifting initiation tooth S42D. In this embodiment, the fourth intermediate sprocket S4 includes a plurality of downshifting initiation teeth S42D. The at least one downshifting initiation tooth S42D is configured to initially receive the bicycle chain C engaged with the neighboring smaller sprocket S3 (FIG. 2) of the plurality of intermediate sprockets SM in a downshifting operation in which the bicycle chain C is shifted from the neighboring smaller sprocket S3 (FIG. 2) of the plurality of intermediate sprockets SM to the fourth intermediate sprocket S4.

The fourth intermediate sprocket S4 includes a plurality of upshifting facilitation recesses S44U. The upshifting facilitation recess S44U is configured to reduce interference between the fourth intermediate sprocket S4 and the bicycle chain C in the upshifting operation. The upshifting initiation tooth S42U1 is provided in the upshifting facilitation recess S44U. The additional upshifting initiation tooth S42U2 is provided in the upshifting facilitation recess S44U.

The fourth intermediate sprocket S4 includes a plurality of downshifting facilitation recesses S44D. The downshifting facilitation recess S44D is configured to reduce interference between the fourth intermediate sprocket S4 and the bicycle chain C in the downshifting operation. The downshifting initiation tooth S42D is provided adjacent to the downshifting facilitation recess S44D without another tooth therebetween in the circumferential direction D1. The downshifting initiation tooth S42D is provided on an upstream side of the downshifting facilitation recess S44D in the driving rotational direction D11.

As seen in FIG. 9, at least one sprocket of the plurality of intermediate sprockets SM includes an upshifting initiation tooth and an additional upshifting initiation tooth. The at least one sprocket of the plurality of intermediate sprockets SM includes at least one upshifting initiation tooth. The third intermediate sprocket S3 includes upshifting initiation tooth S32U and an additional upshifting initiation tooth S32U. The upshifting initiation tooth S32U of the third intermediate sprocket S3 is configured to initially disengage from the bicycle chain C in an upshifting operation in which the bicycle chain C is shifted from the third intermediate sprocket S3 to a neighboring smaller sprocket S2 (FIG. 2) of the plurality of intermediate sprockets SM. The additional upshifting initiation tooth S32U of the third intermediate sprocket S3 is configured to initially disengage from the bicycle chain C in another upshifting operation in which the bicycle chain C is shifted from the third intermediate sprocket S3 to the neighboring smaller sprocket S2 (FIG. 2) of the plurality of intermediate sprockets SM.

In this embodiment, the third intermediate sprocket S3 includes an upshifting initiation tooth S32U1 and an additional upshifting initiation tooth S32U2. The upshifting initiation tooth S32U1 of the third intermediate sprocket S3 is configured to initially disengage from the bicycle chain C in an upshifting operation in which the bicycle chain C is shifted from the third intermediate sprocket S3 to the neighboring smaller sprocket S2 (FIG. 2) of the plurality of intermediate sprockets SM. The additional upshifting initiation tooth S32U2 of the third intermediate sprocket S3 is configured to initially disengage from the bicycle chain C in another upshifting operation in which the bicycle chain C is shifted from the third intermediate sprocket S3 to the neighboring smaller sprocket S2 (FIG. 2) of the plurality of intermediate sprockets SM.

The tooth-space number difference TND3 between the second and third intermediate sprockets S2 and S3 indicates a maximum total number of upshifting and downshifting initiation teeth that can be provided in the third intermediate sprocket S3.

The upshifting initiation tooth S32U1 and the additional upshifting initiation tooth S32U2 are spaced apart from each other without another upshifting initiation tooth therebetween in the circumferential direction D1. The upshifting initiation tooth S32U1 is spaced apart from the additional upshifting initiation tooth S32U2 without another upshifting initiation tooth therebetween in the driving rotational direction D11. The additional upshifting initiation tooth S32U2 is spaced apart from the upshifting initiation tooth S32U1 without another upshifting initiation tooth therebetween in the driving rotational direction D11.

An odd number of tooth-spaces S35 is disposed between the upshifting initiation tooth S32U of the at least one sprocket (e.g., the third intermediate sprocket S3) of the plurality of intermediate sprockets SM and the additional upshifting initiation tooth S32U of the at least one sprocket (e.g., the third intermediate sprocket S3) of the plurality of intermediate sprockets SM in the circumferential direction D1. In this embodiment, an odd number of tooth-spaces S35 (e.g., nine tooth-spaces S35 in this embodiment) is disposed between the upshifting initiation tooth S32U1 of the third intermediate sprocket S3 of the plurality of intermediate sprockets SM and the additional upshifting initiation tooth S32U2 of the third intermediate sprocket S3 of the plurality of intermediate sprockets SM in the circumferential direction D1 on each of an upstream side and a downstream side of the upshifting initiation tooth S32U1.

The at least one sprocket of the plurality of intermediate sprockets SM includes at least one downshifting initiation tooth S32D. In this embodiment, the third intermediate sprocket S3 includes a plurality of downshifting initiation teeth S32D. The at least one downshifting initiation tooth S32D is configured to initially receive the bicycle chain C engaged with the neighboring smaller sprocket S2 (FIG. 2) of the plurality of intermediate sprockets SM in a downshifting operation in which the bicycle chain C is shifted from the neighboring smaller sprocket S2 (FIG. 2) of the plurality of intermediate sprockets SM to the third intermediate sprocket S3.

The third intermediate sprocket S3 includes a plurality of upshifting facilitation recesses S34U. The upshifting facilitation recess S34U is configured to reduce interference between the third intermediate sprocket S3 and the bicycle chain C in the upshifting operation. The upshifting initiation tooth S32U1 is provided in the upshifting facilitation recess S34U. The additional upshifting initiation tooth S32U2 is provided in the upshifting facilitation recess S34U.

The third intermediate sprocket S3 includes a plurality of downshifting facilitation recesses S34D. The downshifting facilitation recess S34D is configured to reduce interference between the third intermediate sprocket S3 and the bicycle chain C in the downshifting operation. The downshifting initiation tooth S32D is provided adjacent to the downshifting facilitation recess S34D without another tooth therebetween in the circumferential direction D1. The downshifting initiation tooth S32D is provided on an upstream side of the downshifting facilitation recess S34D in the driving rotational direction D11.

As seen in FIG. 8, the second intermediate sprocket S2 includes upshifting initiation tooth S22U. The upshifting initiation tooth S22U of the second intermediate sprocket S2 is configured to initially disengage from the bicycle chain C in an upshifting operation in which the bicycle chain C is shifted from the second intermediate sprocket S2 to a neighboring smaller sprocket S (FIG. 2) of the plurality of intermediate sprockets SM.

The at least one sprocket of the plurality of intermediate sprockets SM includes at least one downshifting initiation tooth S22D. In this embodiment, the second intermediate sprocket S2 includes a downshifting initiation tooth S22D. The downshifting initiation tooth S22D is configured to initially receive the bicycle chain C engaged with the neighboring smaller sprocket S1 (FIG. 2) of the plurality of intermediate sprockets SM in a downshifting operation in which the bicycle chain C is shifted from the neighboring smaller sprocket S1 (FIG. 2) of the plurality of intermediate sprockets SM to the second intermediate sprocket S2.

The second intermediate sprocket S2 includes an upshifting facilitation recess S24U. The upshifting facilitation recess S24U is configured to reduce interference between the second intermediate sprocket S2 and the bicycle chain C in the upshifting operation. The upshifting initiation tooth S22U is provided in the upshifting facilitation recess S24U.

The tooth-space number difference TND2 between the first and second intermediate sprockets S1 and S2 indicates a maximum total number of upshifting and downshifting initiation teeth that can be provided in the second intermediate sprocket S2.

The second intermediate sprocket S2 includes a downshifting facilitation recess S24D. The downshifting facilitation recess S24D is configured to reduce interference between the second intermediate sprocket S2 and the bicycle chain C in the downshifting operation. The downshifting initiation tooth S22D is provided adjacent to the downshifting facilitation recess S24D without another tooth therebetween in the circumferential direction D1. The downshifting initiation tooth S22D is provided on an upstream side of the downshifting facilitation recess S24D in the driving rotational direction D11.

As seen in FIG. 7, at least one sprocket of the plurality of intermediate sprockets SM includes an upshifting initiation tooth and an additional upshifting initiation tooth. The at least one sprocket of the plurality of intermediate sprockets SM includes at least one upshifting initiation tooth. The first intermediate sprocket S1 includes upshifting initiation tooth S12U and an additional upshifting initiation tooth S12U. The upshifting initiation tooth S12U of the first intermediate sprocket S1 is configured to initially disengage from the bicycle chain C in an upshifting operation in which the bicycle chain C is shifted from the first intermediate sprocket S1 to a neighboring smaller sprocket SS (FIG. 2) of the plurality of intermediate sprockets SM. The additional upshifting initiation tooth S12U of the first intermediate sprocket S1 is configured to initially disengage from the bicycle chain C in another upshifting operation in which the bicycle chain C is shifted from the first intermediate sprocket S1 to the neighboring smaller sprocket SS (FIG. 2) of the plurality of intermediate sprockets SM.

In this embodiment, the first intermediate sprocket S1 includes an upshifting initiation tooth S12U1 and an additional upshifting initiation tooth S12U2. The upshifting initiation tooth S12U 1 of the first intermediate sprocket S1 is configured to initially disengage from the bicycle chain C in an upshifting operation in which the bicycle chain C is shifted from the first intermediate sprocket S1 to the neighboring smaller sprocket SS (FIG. 2) of the plurality of intermediate sprockets SM. The additional upshifting initiation tooth S12U2 of the first intermediate sprocket S1 is configured to initially disengage from the bicycle chain C in another upshifting operation in which the bicycle chain C is shifted from the first intermediate sprocket S1 to the neighboring smaller sprocket SS (FIG. 2) of the plurality of intermediate sprockets SM.

The tooth-space number difference TND1 between the smallest sprocket SS and the first intermediate sprockets SS and S1 indicates a maximum total number of upshifting and downshifting initiation teeth that can be provided in the first intermediate sprocket S1.

The upshifting initiation tooth S12U1 and the additional upshifting initiation tooth S12U2 are spaced apart from each other without another upshifting initiation tooth therebetween in the circumferential direction D1. The upshifting initiation tooth S12U1 is spaced apart from the additional upshifting initiation tooth S12U2 without another upshifting initiation tooth therebetween in the driving rotational direction D11. The additional upshifting initiation tooth S12U2 is spaced apart from the upshifting initiation tooth S12U 1 without another upshifting initiation tooth therebetween in the driving rotational direction D11.

An even number of tooth-spaces S15 is disposed between the upshifting initiation tooth S12U of the at least one sprocket (e.g., the first intermediate sprocket S1) of the plurality of intermediate sprockets SM and the additional upshifting initiation tooth S12U of the at least one sprocket (e.g., the first intermediate sprocket S1) of the plurality of intermediate sprockets SM in the circumferential direction D1. In this embodiment, an even number of tooth-spaces S15 (e.g., six tooth-spaces S15 in this embodiment) is disposed between the upshifting initiation tooth S12U1 of the first intermediate sprocket S1 of the plurality of intermediate sprockets SM and the additional upshifting initiation tooth S12U2 of the first intermediate sprocket S1 of the plurality of intermediate sprockets SM in the circumferential direction D1 on each of an upstream side and a downstream side of the upshifting initiation tooth S12U1.

The at least one sprocket of the plurality of intermediate sprockets SM includes at least one downshifting initiation tooth S12D. In this embodiment, the first intermediate sprocket S1 includes a plurality of downshifting initiation teeth S12D. The at least one downshifting initiation tooth S12D is configured to initially receive the bicycle chain C engaged with the neighboring smaller sprocket SS (FIG. 2) of the plurality of intermediate sprockets SM in a downshifting operation in which the bicycle chain C is shifted from the neighboring smaller sprocket SS (FIG. 2) of the plurality of intermediate sprockets SM to the first intermediate sprocket S1.

The first intermediate sprocket S1 includes a plurality of upshifting facilitation recesses S14U. The upshifting facilitation recess S14U is configured to reduce interference between the first intermediate sprocket S1 and the bicycle chain C in the upshifting operation. The upshifting initiation tooth S12U1 is provided in the upshifting facilitation recess S14U. The additional upshifting initiation tooth S12U2 is provided in the upshifting facilitation recess S14U.

The first intermediate sprocket S1 includes a downshifting facilitation recess S14D. The downshifting facilitation recess S14D is configured to reduce interference between the first intermediate sprocket S1 and the bicycle chain C in the downshifting operation. The downshifting initiation tooth S12D is provided adjacent to the downshifting facilitation recess S14D without another tooth therebetween in the circumferential direction D1. The downshifting initiation tooth S12D is provided on an upstream side of the downshifting facilitation recess S14D in the driving rotational direction D11.

In this embodiment, the first intermediate sprocket S1 can also be referred to as a chain-phase adjusting sprocket S1. Namely, the plurality of intermediate sprockets SM includes the chain-phase adjusting sprocket S1. The chain-phase adjusting sprocket S1 is configured to change a chain phase of the bicycle chain C to another chain phase in a shifting operation in which the bicycle chain C is shifted from the chain-phase adjusting sprocket S1 to the neighboring smaller sprocket SS (FIG. 2).

A total tooth-space number of the chain-phase adjusting sprocket S1 is equal to or smaller than 18. The total tooth-space number of the chain-phase adjusting sprocket S1 is equal to or larger than 12. The total tooth-space number of the chain-phase adjusting sprocket S1 is equal to or larger than 14. In this embodiment, the total tooth-space number of the chain-phase adjusting sprocket S is 14. However, the total tooth-space number of the chain-phase adjusting sprocket is not limited to this embodiment and the above ranges.

The chain-phase adjusting sprocket S1 includes the upshifting initiation tooth S12U1 and the additional upshifting initiation tooth S12U2. The upshifting initiation tooth S12U1 and the additional upshifting initiation tooth S12U2 are spaced apart from each other without another upshifting initiation tooth therebetween in a circumferential direction D1 with respect to the rotational center axis A1 of the bicycle sprocket arrangement 10.

An even number of tooth-spaces S15 are disposed between the upshifting initiation tooth S12U 1 of the chain-phase adjusting sprocket S1 and the additional upshifting initiation S12U2 of the tooth chain-phase adjusting sprocket S1. An even number of tooth-spaces S15 (e.g., six tooth-spaces S15 in this embodiment) are disposed between the upshifting initiation tooth S12U1 of the chain-phase adjusting sprocket S1 and the additional upshifting initiation S12U2 of the tooth chain-phase adjusting sprocket S1 in the circumferential direction D1 on each of an upstream side and a downstream side of the upshifting initiation tooth S12U1.

As seen in FIG. 2, the chain-phase adjusting sprocket S1 is adjacent to the smallest sprocket SS without another sprocket therebetween in the axial direction D2 with respect to the rotational center axis A1. However, the chain-phase adjusting sprocket can be other sprockets of the plurality of intermediate sprockets SM.

Figure 15:
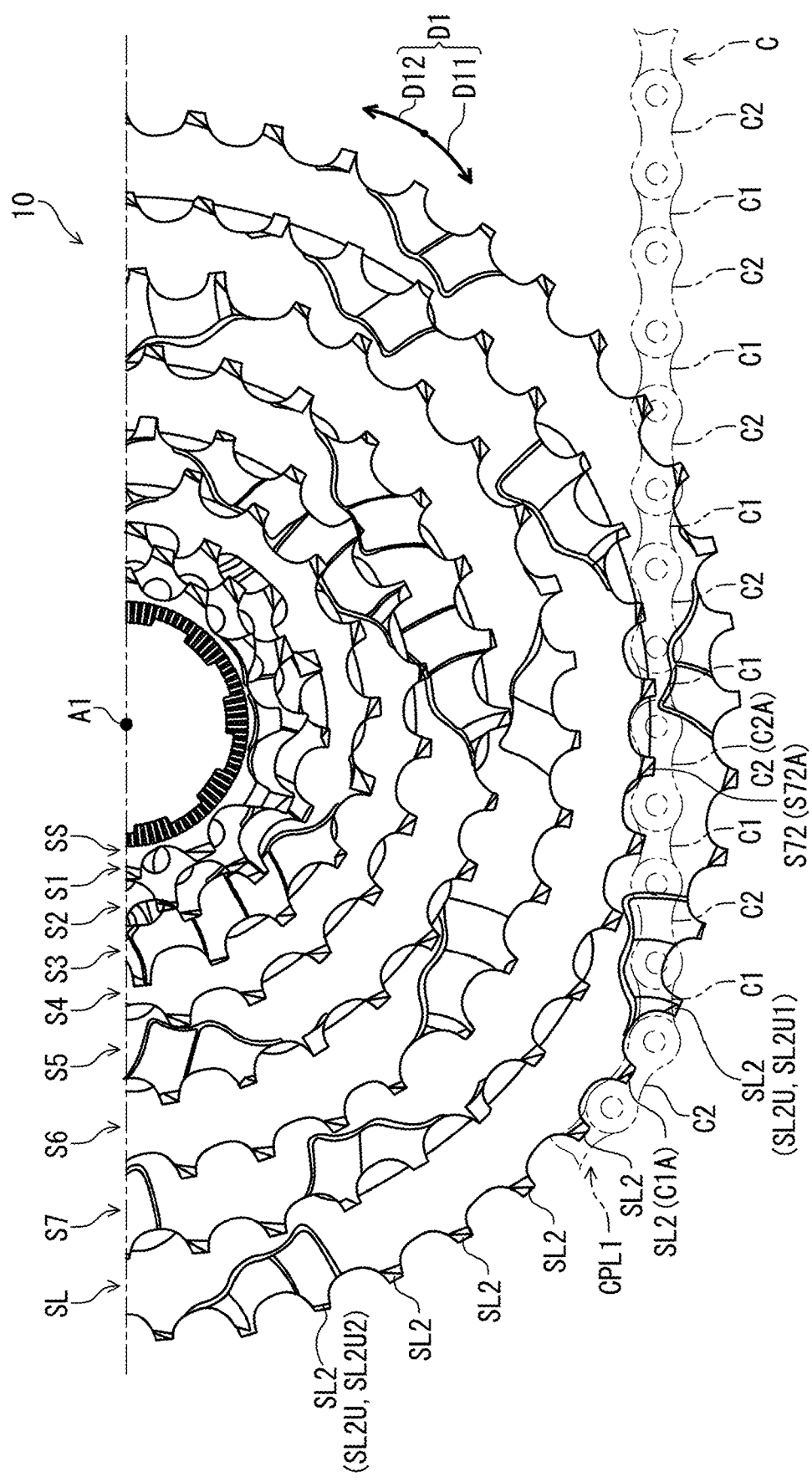
FIG. 15 is a partial side elevational view of the bicycle sprocket arrangement illustrated in FIG. 1, with a bicycle chain (a first chain phase in a largest sprocket).
Figure 16:
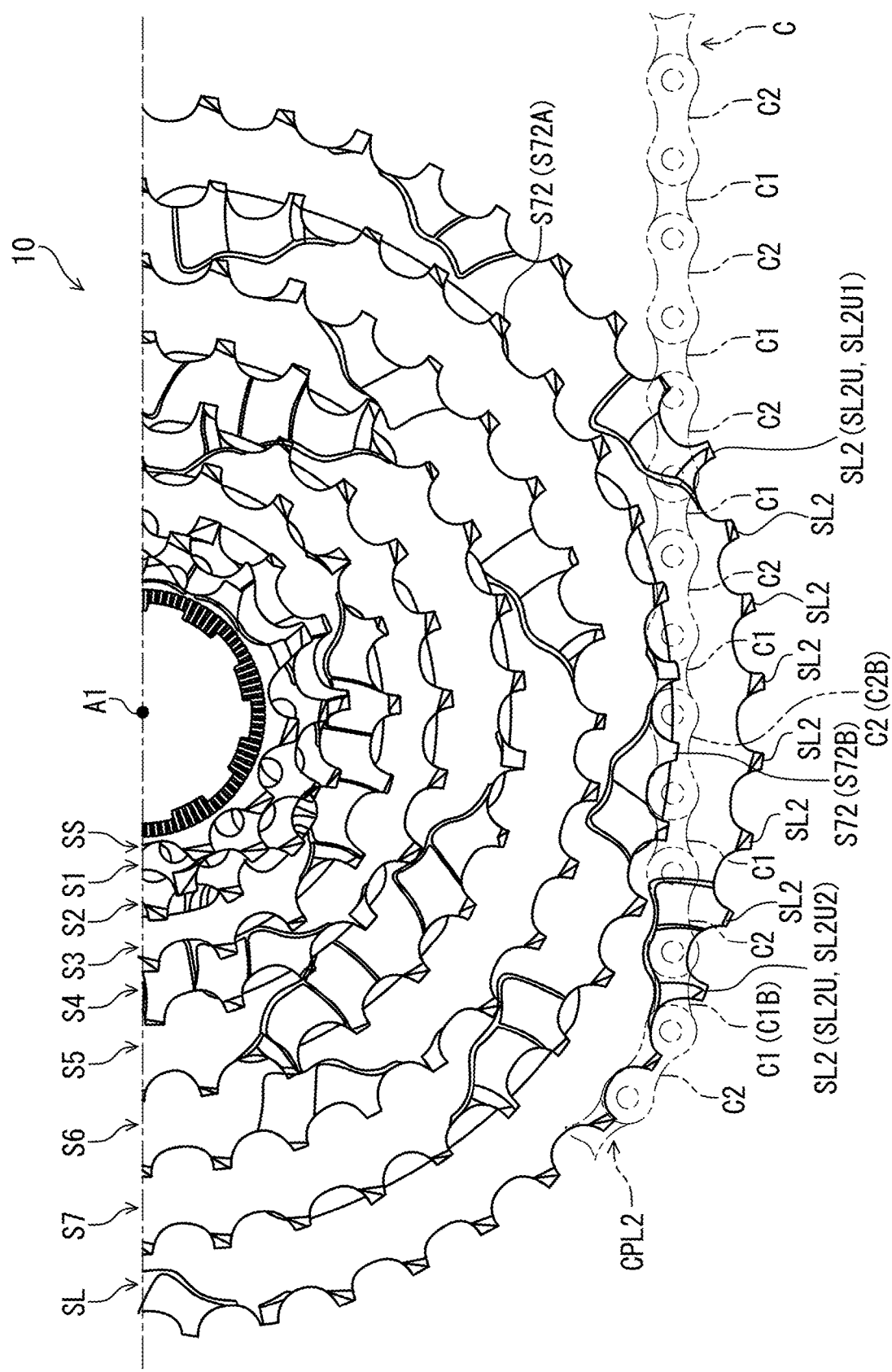
FIG. 16 is a partial side elevational view of the bicycle sprocket arrangement illustrated in FIG. 1, with the bicycle chain (a second chain phase in the largest sprocket).

As seen in FIGS. 15 and 16, the bicycle chain C includes a plurality of opposed pairs of inner link plates C1 and a plurality of opposed pairs of outer link plates C2. The largest sprocket SL is configured to change a chain phase of the bicycle chain C to another chain phase in a shifting operation in which the bicycle chain C is shifted from the largest sprocket SL to the neighboring smaller sprocket S7. In other words, regardless of a chain phase of the bicycle chain C engaged with the largest sprocket SL, the largest sprocket SL is configured to set a chain phase of the bicycle chain C engaged with the neighboring smaller sprocket S7 to a predetermined chain phase of the bicycle chain C in the upshifting operation in which the bicycle chain C is shifted from the largest sprocket SL to the neighboring smaller sprocket S7. Namely, the largest sprocket SL can also be referred to as a chain-phase adjusting sprocket SL.

As seen in FIG. 15, the upshifting initiation tooth SL2U1 of the largest sprocket SL is configured to initially disengage the bicycle chain C from the largest sprocket SL at the opposed pair of inner link plates C1 (e.g., CIA) of the bicycle chain C in the upshifting operation in a first chain phase CPL1 in which the opposed pair of inner link plates C1 is engageable with the upshifting initiation tooth SL2U1. In the first chain phase CPL1, the opposed pair of outer link plates C2 of the bicycle chain C is engageable with the additional upshifting initiation tooth SL2U2 of the largest sprocket SL since the even number of tooth-spaces SL25 are disposed between the upshifting initiation tooth SL2U1 and the additional upshifting initiation tooth SL2U2 in the circumferential direction D1. The sprocket tooth S72A of the seventh intermediate sprocket S7 receives the opposed pair of outer link plates C2 (e.g., C2A) of the bicycle chain C in the upshifting operation in the first chain phase CPL1 of the largest sprocket SL.

As seen in FIG. 16, the upshifting initiation tooth SL2U2 of the largest sprocket SL is configured to initially disengage the bicycle chain C from the largest sprocket SL at the opposed pair of inner link plates C1 (e.g., C1B) of the bicycle chain C in the upshifting operation in a second chain-phase CPL2 in which an opposed pair of inner link plates C1 is engageable with the upshifting initiation tooth SL2U2. In the second chain-phase CPL2, an opposed pair of outer link plates C2 of the bicycle chain C is engageable with the upshifting initiation tooth SL2U1 of the largest sprocket SL since the even number of tooth-spaces SL25 are disposed between the upshifting initiation tooth SL2U1 and the additional upshifting initiation tooth SL2U2 in the circumferential direction D1. The sprocket tooth S72B of the seventh intermediate sprocket S7 receives the opposed pair of outer link plates C2 (e.g., C2B) of the bicycle chain C in the upshifting operation in the second chain-phase CPL2 of the largest sprocket SL. In this case, the sprocket tooth S72A is engageable with an opposed pair of outer link plates C2 of the bicycle chain C. Thus, regardless of whether the largest sprocket SL is in the first chain phase CPL1 or the second chain-phase CPL2, the chain phase of the bicycle chain C engaged with the seventh intermediate sprocket S7 is maintained to a predetermined chain phase of the bicycle chain C after the upshifting operation in which the bicycle chain C is shifted from the largest sprocket SL to the seventh intermediate sprocket S7.

For example, in a case where a chain phase of the bicycle chain C engaged with a sprocket is another chain phase different from the predetermined chain phase, such another chain phase is less likely to smooth an upshifting operation in which the bicycle chain C is shifted from a larger sprocket toward a neighboring smaller sprocket adjacent to the larger sprocket without another sprocket therebetween. Furthermore, such another chain phase may require the derailleur to change at least two gear stages to complete the upshifting operation. However, it is possible to change the chain phase of the bicycle chain C engaged with the seventh intermediate sprocket S7 from such another chain phase to the predetermined chain phase by shifting the bicycle chain C from the seventh intermediate sprocket S7 to the largest sprocket SL and further returning the bicycle chain C from the largest sprocket SL to the seventh intermediate sprocket S7. Thus, it is possible to reset the chain phase of the bicycle chain C engaged with the neighboring smaller sprocket S7 to the predetermined chain phase by using the largest sprocket SL. This can reduce influence of the chain phase of the bicycle chain C engaged with the neighboring smaller sprocket S7 to a shifting operation in the bicycle sprocket arrangement 10 so that a totally smooth shifting operation can be achieved.

Figure 17:
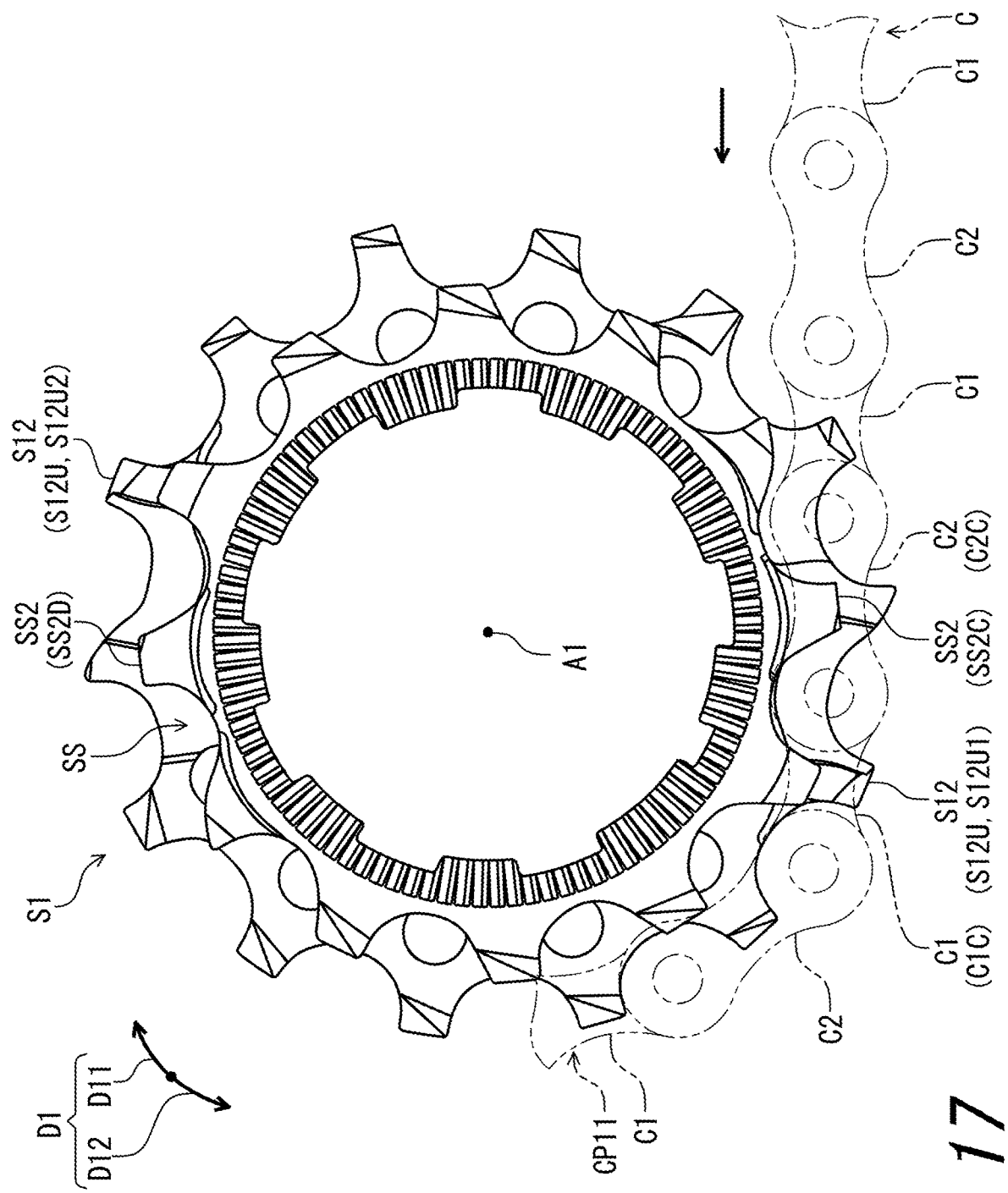
FIG. 17 is a partial side elevational view of the bicycle sprocket arrangement illustrated in FIG. 1, with the bicycle chain (a first chain phase in a chain-phase adjusting sprocket).
Figure 18:
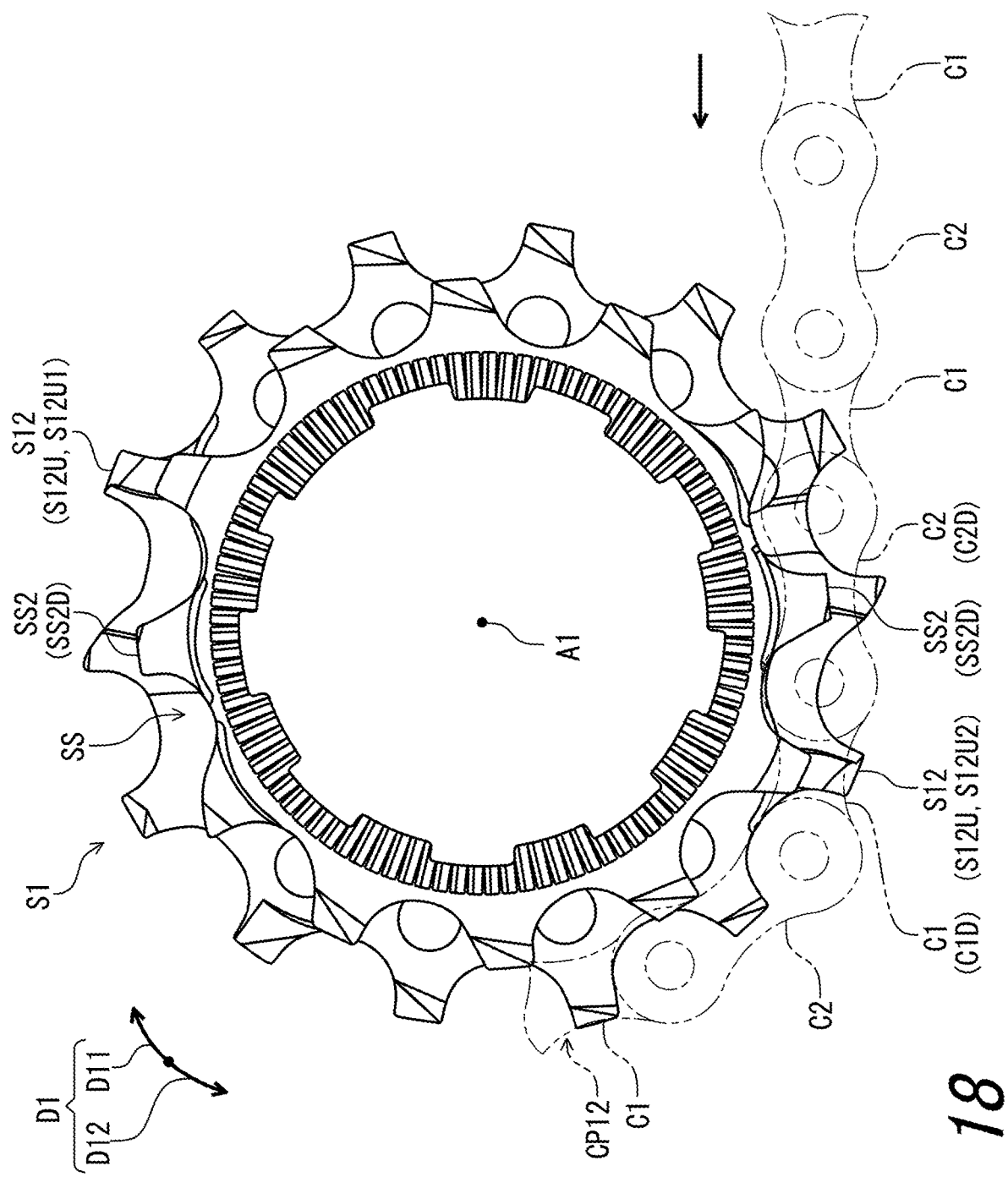
FIG. 18 is a partial side elevational view of the bicycle sprocket arrangement illustrated in FIG. 1, with a bicycle chain (a second chain phase in the chain-phase adjusting sprocket).

As seen in FIGS. 17 and 18, the chain-phase adjusting sprocket S1 is configured to change a chain phase of the bicycle chain C to another chain phase in a shifting operation in which the bicycle chain C is shifted from the chain-phase adjusting sprocket S1 to the neighboring smaller sprocket SS. In other words, regardless of a chain phase of the bicycle chain C engaged with the chain-phase adjusting sprocket S1, the chain-phase adjusting sprocket S1 is configured to set a chain phase of the bicycle chain C engaged with the neighboring smaller sprocket SS to a predetermined chain phase of the bicycle chain C in the upshifting operation in which the bicycle chain C is shifted from the chain-phase adjusting sprocket S1 to the neighboring smaller sprocket SS.

As seen in FIG. 17, the upshifting initiation tooth S12U1 of the chain-phase adjusting sprocket S1 is configured to initially disengage the bicycle chain C from the chain-phase adjusting sprocket S1 at the opposed pair of inner link plates C1 (e.g., C1C) of the bicycle chain C in the upshifting operation in a first chain phase CP11 in which the opposed pair of inner link plates C1 is engageable with the upshifting initiation tooth S12U1. In the first chain phase CP11, the opposed pair of outer link plates C2 of the bicycle chain C is engageable with the additional upshifting initiation tooth S12U2 of the chain-phase adjusting sprocket S1 since the even number of tooth-spaces S15 are disposed between the upshifting initiation tooth S12U1 and the additional upshifting initiation tooth S12U2 in the circumferential direction D1. The sprocket tooth SS2C of the neighboring smaller sprocket SS receives the opposed pair of outer link plates C2 (e.g., C2C) of the bicycle chain C in the upshifting operation in the first chain phase CP11 of the first intermediate sprocket S1.

As seen in FIG. 18, the upshifting initiation tooth S12U2 of the chain-phase adjusting sprocket S1 is configured to initially disengage the bicycle chain C from the chain-phase adjusting sprocket S1 at the opposed pair of inner link plates C1 (e.g., C1D) in the upshifting operation in a second chain-phase CP12 in which the opposed pair of inner link plates C1 is engageable with the upshifting initiation tooth S12U2. In the second chain-phase CP12, the opposed pair of outer link plates C2 of the bicycle chain C is engageable with the upshifting initiation tooth S12U1 of the chain-phase adjusting sprocket S1 since the even number of tooth-spaces S15 are disposed between the upshifting initiation tooth S12U1 and the additional upshifting initiation tooth S12U2 in the circumferential direction D1. The sprocket tooth SS2D of the neighboring smaller sprocket SS receives the opposed pair of outer link plates C2 (e.g., C2D) of the bicycle chain C in the upshifting operation in the second chain-phase CP12 of the largest sprocket SL. In this case, the sprocket tooth SS2D is engageable with the opposed pair of outer link plates C2 of the bicycle chain C. Thus, regardless of whether the chain-phase adjusting sprocket S1 is in the first chain phase CP11 or the second chain-phase CP12, the chain phase of the bicycle chain C engaged with the neighboring smaller sprocket SS is maintained to the predetermined chain phase after the upshifting operation in which the bicycle chain C is shifted from the chain-phase adjusting sprocket S1 to the neighboring smaller sprocket SS. In this embodiment, the neighboring smaller sprocket SS is the smallest sprocket SS in bicycle the sprocket arrangement 10.

For example, in a case where a chain phase of the bicycle chain C engaged with a sprocket is another chain phase different from the predetermined chain phase, such another chain phase is less likely to smooth an upshifting operation in which the bicycle chain C is shifted from a larger sprocket toward a neighboring smaller sprocket adjacent to the larger sprocket without another sprocket therebetween. Furthermore, such another chain phase may require the derailleur to change at least two gear stages to complete the upshifting operation. However, it is possible to change the chain phase of the bicycle chain C from such another chain phase to the predetermined chain phase by shifting the bicycle chain C from the chain-phase adjusting sprocket S1 to the neighboring smaller sprocket SS. Thus, it is possible to reset the chain phase of the bicycle chain C engaged with the neighboring smaller sprocket SS to the predetermined chain phase by using the chain-phase adjusting sprocket S1. This can reduce influence of the chain phase of the bicycle chain C engaged with the chain-phase adjusting sprocket S1 to a shifting operation in the bicycle sprocket arrangement 10 so that a totally smooth shifting operation can be achieved.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket arrangement comprising:
   a largest sprocket having a largest total tooth-space number that is an odd number, the largest sprocket including an upshifting initiation tooth and an additional upshifting initiation tooth which are spaced apart from each other without another upshifting initiation tooth therebetween in a circumferential direction with respect to a rotational center axis of the bicycle sprocket arrangement, an even number of tooth-spaces being disposed between the upshifting initiation tooth and the additional upshifting initiation tooth in the circumferential direction;
   a smallest sprocket having a smallest total tooth-space number that is an even number;
   a plurality of intermediate sprockets disposed between the largest sprocket and the smallest sprocket in an axial direction with respect to a rotational center axis of the bicycle sprocket arrangement;
   a tooth-space number difference being defined as a difference between a total tooth-space number of a large sprocket among the plurality of intermediate sprockets and a total tooth-space number of a small sprocket among the plurality of intermediate sprockets and the smallest sprocket, the large sprocket and the small sprocket being adjacent to each other without another sprocket therebetween in the axial direction;
   a first quotient being obtained if the total tooth-space number of the large sprocket is divided by a half of the tooth-space number difference, the first quotient being an even number with respect to all sprockets of the plurality of intermediate sprockets; and
   a second quotient being obtained if the total tooth-space number of the small sprocket is divided by a half of the tooth-space number difference, the second quotient being an even number with respect to all sprockets of the plurality of intermediate sprockets excluding a largest intermediate sprocket of the plurality of intermediate sprockets.

2. The bicycle sprocket arrangement according to claim 1, wherein
   the upshifting initiation tooth of the largest sprocket is configured to initially disengage from a bicycle chain in an upshifting operation in which the bicycle chain is shifted from the largest sprocket to a neighboring smaller sprocket of the plurality of intermediate sprockets, and
   the additional upshifting initiation tooth of the largest sprocket is configured to initially disengage from the bicycle chain in another upshifting operation in which the bicycle chain is shifted from the largest sprocket to the neighboring smaller sprocket of the plurality of intermediate sprockets.

3. The bicycle sprocket arrangement according to claim 1, wherein
   the largest sprocket includes at least one downshifting initiation tooth configured to initially receive a bicycle chain engaged with a neighboring smaller sprocket of the plurality of intermediate sprockets in a downshifting operation in which the bicycle chain is shifted from the neighboring smaller sprocket of the plurality of intermediate sprockets to the largest sprocket.

4. The bicycle sprocket arrangement according to claim 1, wherein
   at least one sprocket of the plurality of intermediate sprockets includes an upshifting initiation tooth and an additional upshifting initiation tooth which are spaced apart from each other without another upshifting initiation tooth therebetween in the circumferential direction.

5. The bicycle sprocket arrangement according to claim 4, wherein
   an odd number of tooth-spaces is disposed between the upshifting initiation tooth of the at least one sprocket of the plurality of intermediate sprockets and the additional upshifting initiation tooth of the at least one sprocket of the plurality of intermediate sprockets in the circumferential direction.

6. The bicycle sprocket arrangement according to claim 1, wherein
   the largest total tooth-space number is equal to or larger than 34.

7. The bicycle sprocket arrangement according to claim 1, wherein
   the plurality of intermediate sprockets includes a chain-phase adjusting sprocket, and the chain-phase adjusting sprocket is configured to change a chain phase of a bicycle chain to another chain phase in a shifting operation in which the bicycle chain is shifted from the chain-phase adjusting sprocket to a neighboring smaller sprocket.

8. The bicycle sprocket arrangement according to claim 7, wherein
the chain-phase adjusting sprocket is adjacent to the smallest sprocket without another sprocket therebetween in the axial direction.

9. The bicycle sprocket arrangement according to claim 7, wherein
the chain-phase adjusting sprocket includes an upshifting initiation tooth and an additional upshifting initiation tooth which are spaced apart from each other without another upshifting initiation tooth therebetween in the circumferential direction, and
an even number of tooth-spaces is disposed between the upshifting initiation tooth of the chain-phase adjusting sprocket and the additional upshifting initiation of the tooth chain-phase adjusting sprocket.

10. The bicycle sprocket arrangement according to claim 7, wherein
a total tooth-space number of the chain-phase adjusting sprocket is equal to or smaller than 18.

11. The bicycle sprocket arrangement according to claim 7, wherein
a total tooth-space number of the chain-phase adjusting sprocket is equal to or larger than 12.

12. The bicycle sprocket arrangement according to claim 1, wherein
at least one sprocket of the plurality of intermediate sprockets includes at least one upshifting initiation tooth and at least one downshifting initiation tooth.

13. The bicycle sprocket arrangement according to claim 1, wherein
the plurality of intermediate sprockets includes:
a first intermediate sprocket having a total tooth-space number which is 14;
a second intermediate sprocket having a total tooth-space number which is 16;
a third intermediate sprocket having a total tooth-space number which is 20;
a fourth intermediate sprocket having a total tooth-space number which is 24;
a fifth intermediate sprocket having a total tooth-space number which is 30;
a sixth intermediate sprocket having a total tooth-space number which is 36; and
a seventh intermediate sprocket having a total tooth-space number which is 42.

14. The bicycle sprocket arrangement according to claim 13, wherein
the largest total tooth-space number is 49, and
the smallest total tooth-space number is 12.

15. A bicycle sprocket arrangement comprising:
a largest sprocket having a largest total tooth-space number;
a smallest sprocket having a smallest total tooth-space number that is an even number; and
a plurality of intermediate sprockets each of which has a total tooth-space number that is an even number, the plurality of intermediate sprockets being disposed between the largest sprocket and the smallest sprocket in an axial direction with respect to a rotational center axis of the bicycle sprocket arrangement and including a chain-phase adjusting sprocket that includes an upshifting initiation tooth and an additional upshifting initiation tooth which are spaced apart from each other without another upshifting initiation tooth therebetween in a circumferential direction with respect to the rotational center axis, an even number of tooth-spaces being disposed between the upshifting initiation tooth of the chain-phase adjusting sprocket and the additional upshifting initiation tooth of the chain-phase adjusting sprocket in the circumferential direction.

16. The bicycle sprocket arrangement according to claim 15, wherein
the chain-phase adjusting sprocket is adjacent to the smallest sprocket without another sprocket therebetween in the axial direction.

17. The bicycle sprocket arrangement according to claim 15, wherein
a total tooth-space number of the chain-phase adjusting sprocket is equal to or smaller than 18.

18. The bicycle sprocket arrangement according to claim 15, wherein
a total tooth-space number of the chain-phase adjusting sprocket is equal to or larger than 12.

19. The bicycle sprocket arrangement according to claim 15, wherein
the largest total tooth-space number is an odd number.

20. The bicycle sprocket arrangement according to claim 15, wherein
the plurality of intermediate sprockets has a tooth-space number difference defined as a difference between a total tooth-space number of a large sprocket among the plurality of intermediate sprockets and a total tooth-space number of a small sprocket among the plurality of intermediate sprockets and the smallest sprocket,
the large sprocket and the small sprocket are adjacent to each other without another sprocket therebetween in an axial direction with respect to the rotational center axis, and
the tooth-space number difference is two with respect to at least two sprockets of the plurality of intermediate sprockets.

21. The bicycle sprocket arrangement according to claim 15, wherein
at least one sprocket of the plurality of intermediate sprockets includes an upshifting initiation tooth and an additional upshifting initiation tooth, and
an odd number of tooth-spaces is disposed between the upshifting initiation tooth of the at least one sprocket of the plurality of intermediate sprockets and the additional upshifting initiation tooth of the at least one sprocket of the plurality of intermediate sprockets in the circumferential direction.

22. The bicycle sprocket arrangement according to claim 15, wherein
a tooth-space number difference is defined as a difference between a total tooth-space number of a large sprocket among the plurality of intermediate sprockets and a total tooth-space number of a small sprocket among the plurality of intermediate sprockets and the smallest sprocket,
the large sprocket and the small sprocket are adjacent to each other without another sprocket therebetween in an axial direction with respect to the rotational center axis,
a first quotient is obtained if the total tooth-space number of the large sprocket is divided by a half of the tooth-space number difference,
the first quotient is an even number with respect to all sprockets of the plurality of intermediate sprockets, a second quotient is obtained if the total tooth-space number of the small sprocket is divided by a half of the tooth-space number difference, and the second quotient is an even number with respect to all sprockets of the plurality of intermediate sprockets excluding a largest intermediate sprocket of the plurality of intermediate sprockets.

23. The bicycle sprocket arrangement according to claim 15, wherein the plurality of intermediate sprockets includes:
- a first intermediate sprocket having a total tooth-space number which is 14;
- a second intermediate sprocket having a total tooth-space number which is 16;
- a third intermediate sprocket having a total tooth-space number which is 20;
- a fourth intermediate sprocket having a total tooth-space number which is 24;
- a fifth intermediate sprocket having a total tooth-space number which is 30;
- a sixth intermediate sprocket having a total tooth-space number which is 36; and
- a seventh intermediate sprocket having a total tooth-space number which is 42.

24. The bicycle sprocket arrangement according to claim 23, wherein the largest total tooth-space number is one of 48 and 49, and the smallest total tooth-space number is 12.

* * * * *